(12) United States Patent
Chandramouli et al.

(10) Patent No.: US 11,392,570 B2
(45) Date of Patent: Jul. 19, 2022

(54) KEY-VALUE STORE SYSTEM

(71) Applicant: Microsoft Technology Licensing, LLC, Redmond, WA (US)

(72) Inventors: Badrish Chandramouli, Redmond, WA (US); Gunaprasaad Jeganathan, Seattle, WA (US); Donald Kossmann, Kirkland, WA (US); Justin J Levandoski, Seattle, WA (US); James Hunter, Redmond, WA (US); Mike Barnett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 873 days.

(21) Appl. No.: 15/917,352

(22) Filed: Mar. 9, 2018

(65) Prior Publication Data
US 2019/0278849 A1 Sep. 12, 2019

(51) Int. Cl.
*G06F 16/22* (2019.01)
*G06F 16/2455* (2019.01)

(52) U.S. Cl.
CPC .... *G06F 16/2255* (2019.01); *G06F 16/24565* (2019.01)

(58) Field of Classification Search
CPC .................. G06F 16/2255; G06F 16/24565
See application file for complete search history.

(56) References Cited

U.S. PATENT DOCUMENTS

| 6,523,059 | B1* | 2/2003 | Schmidt | G06F 9/52 718/100 |
| 2007/0283113 | A1* | 12/2007 | Grunkemeyer | G06F 12/1441 711/163 |
| 2010/0100575 | A1* | 4/2010 | Auerbach | G06F 9/526 708/100 |
| 2010/0107168 | A1* | 4/2010 | Auerbach | G06F 12/0269 718/103 |
| 2013/0346725 | A1* | 12/2013 | Lomet | G06F 16/2246 711/206 |
| 2016/0110403 | A1* | 4/2016 | Lomet | G06F 16/2322 707/695 |
| 2016/0283540 | A1* | 9/2016 | Barber | G06F 16/137 |

OTHER PUBLICATIONS

"Apache Beam: An advanced Unified Programming Model", Retrieved from: <<https://beam.apache.org/>>, Retrieved Date: Feb. 28, 2018, 7 Pages.

(Continued)

*Primary Examiner* — Apu M Mofiz
*Assistant Examiner* — Husam Turki Samara
(74) *Attorney, Agent, or Firm* — Schwegman Lundberg & Woessner, P.A.

(57) ABSTRACT

A system includes a processor and a memory storing multiple records in a key-value data structure and processor executable instructions for managing access to records in the key-value data structure. The instructions are executable to perform operations including managing a shared atomic epoch counter and thread epoch counters, determining a maximal safe epoch as a function of the shared atomic epoch counter and the thread epoch counters, maintaining a drain list of trigger actions, and triggering the trigger actions in the drain list as a function of an update of the shared atomic epoch counter and the maximal safe epoch.

20 Claims, 19 Drawing Sheets

(56) References Cited

OTHER PUBLICATIONS

"Apache Cassandra", Retrieved from: <<http://cassandra.apache.org/>>, Retrieved Date: Feb. 28, 2018, 3 Pages.
"Apache Flink", Retrieved from: <<https://flink.apache.org/>>, Retrieved Date: Feb. 28, 2018, 3 Pages.
"Apache Hadoop?", Retrieved from: <<http://hadoop.apache.org/>>, Dec. 18, 2017, 10 Pages.
Baunton, Ed, "facebook/rocksdb", Retrieved from: <<https://github.com/facebook/rocksdb/wiki>>, Jul. 18, 2017, 5 Pages.
"Google Cloud Dataflow", Retrieved from: <<https://cloud.google.com/dataflow/>>, Retrieved Date: Feb. 28, 2018, 10 Pages.
"Intel Threading Building Blocks", Retrieved from: <<https://www.threadingbuildingblocks.org/>>, Retrieved Date: Feb. 28, 2018, 3 Pages.
"Jemalloc". Retrieved from: <<http://jemalloc.net/a>>, Retrieved Date: Feb. 28, 2018, 2 Pages.
"Memcached", Retrieved from: <<https://memcached.org/>>, Retrieved Date: Feb. 28, 2018, 3 Pages.
"Performance Benchmarks", Retrieved from: <<https://github.com/facebook/rocksdb/wiki/performance-benchmarks>>, Dec. 20, 2017, 11 Pages.
"Redis", Retrieved from: <<https://redis.io/>>. Retrieved Date: Feb. 28, 2018, 2 Pages.
"RocksDB", Retrieved from: <<http://rocksdb.org/>>,Retrieved Date: Feb. 28, 2018, 8 Pages.
"State Store: A New Framework for State Management for Computing Streaming Aggregates", Retrieved from: <<https://issues.apache.org/jira/browse/SPARK-13809>>, Retrieved Date: Feb. 28, 2018, 1 Page.
"Trident State", Retrieved from: <<http://storm.apache.org/releases/current/Trident-state.html>>, Retrieved Date: Feb. 28, 2018, 14 Pages.
Bernstein, et al., "Orleans: Distributed Virtual Actors for Programmability and Scalability", In TechReport MSR-TR-2014-41, Mar. 24, 2014, pp. 1-13.
Chang, et al, "Bigtable: A Distributed Storage System for Structured Data", In Journal of ACM Transactions on Computer Systems, vol. 26, Issue 2, Jun. 2008, 26 Pages.
Cooper, et al, "Benchmarking Cloud Serving Systems with YCSB", In Proceedings of the 1st ACM Symposium on Cloud Computing, Jun. 10, 2010, pp. 143-154.
Diaconu, et al, "Hekaton: SQL Server's Memory-Optimized OLTP Engine", In Proceedings of the ACM SIGMOD International Conference on Management of Data, Jun. 22, 2013, pp. 1243-1254.
Dragojevic, et al, "FaRM: Fast Remote Memory", In Proceedings of 11th USENIX Symposium on Networked Systems Design and Implementation, Apr. 2, 2014, 15 Pages.
Gray, et al, "The Five-Minute Rule Ten Years Later, and Other Computer Storage Rules of Thumb", In Newsletter ACM SIGMOD Record, vol. 26, Issue 4, Dec. 1997, pp. 63-68.
Kallman, et al, "H-Store: A High-Performance, Distributed Main Memory Transaction Processing System", In Proceedings of the VLDB Endowment, vol. 1, Issue 2, Aug. 23, 2008, pp. 1496-1499.
Kung, et al, "Concurrent Manipulation of Binary Search Trees", In Journal of ACM Transactions on Database Systems, vol. 5, Issue 3, Sep. 1980, pp. 354-382.
Levandoski, et al, "LLAMA: A Cache/Storage Subsystem for Modern Hardware", In Proceedings of the Very Large Database Endowment, vol. 6, Issue 10, Aug. 2013, pp. 877-888.
Levandoski, et al, "The Bw-Tree: A B-tree for New Hardware Platforms", In Proceedings of IEEE 29th International Conference on Data Engineering, Apr. 8, 2013, 12 Pages.
Mao, et al, "Cache Craftiness for Fast Multicore Key-Value Storage", In Proceedings of the 7th ACM European Conference on Computer Systems, Apr. 10, 2012, pp. 183-196.
O'Neil, et al, "The Log-Structured Merge-Tree (LSM-Tree)", In Journal of Acta Informatica, vol. 33, Issue 4, Jun. 1996, pp. 1-32.
O'Neil, et al, "The LRU-K Page Replacement Algorithm for Database Disk Buffering", In Proceedings of the ACM SIGMOD International Conference on Management of Data, May 25, 1993, pp. 297-306.
Ongaro, et al, "Fast Crash Recovery in RAMCloud", In Proceedings of the Twenty-Third ACM Symposium on Operating Systems Principles, Oct. 23, 2011, pp. 29-41.
Ren, et al, "Low-Overhead Asynchronous Checkpointing in Main-Memory Database Systems", In Proceedings of the International Conference on Management of Data, Jun. 26, 2016, pp. 1539-1551.
Rosenblum, et al, "The Design and Implementation of a Log-Structured File System", In Journal of ACM Transactions on Computer Systems, vol. 10, Issue 1, Feb. 1992, pp. 26-52.
Shapiro, et al, "Conflict-Free Replicated Data Types", In Proceedings of the 13th International Conference on Stabilization, Safety, and Security of Distributed Systems, Oct. 10, 2011, pp. 1-15.
Zaharia, et al, "Discretized Streams: Fault-Tolerant Streaming Computation at Scale", In Proceedings of the Twenty-Fourth ACM Symposium on Operating Systems Principles, Nov. 3, 2013, pp. 423-438.
Zaharia, et al, "Spark: Cluster Computing with Working Sets", In Proceedings of the 2nd USENIX Conference on Hot Topics in Cloud Computing, Jun. 22, 2010, pp. 1-7.

* cited by examiner

Thread $T_1$

CAS Entry 5 to
(Tentative, $g_5$)

Scan Bucket for
Duplicate Entry $g_5$
(Possibly Tentative)

If (Not Found)
  Reset Tentative Bit.

Thread $T_2$

CAS Entry 3 to
(Tentative, $g_5$)

Scan Bucket for
Duplicate Entry $g_5$
(Possibly Tentative)

If (Not Found)
  Reset Tentative Bit.

| Logical Address | Action |
|---|---|
| *Invalid* | Make a New Record at Tail-End |
| < *HeadOffset* | Issue Async IO Request |
| < *ReadOnlyOffset* | Make a Mutable Copy at Tail-End |
| < ∞ | Update In-Place |

Table 1

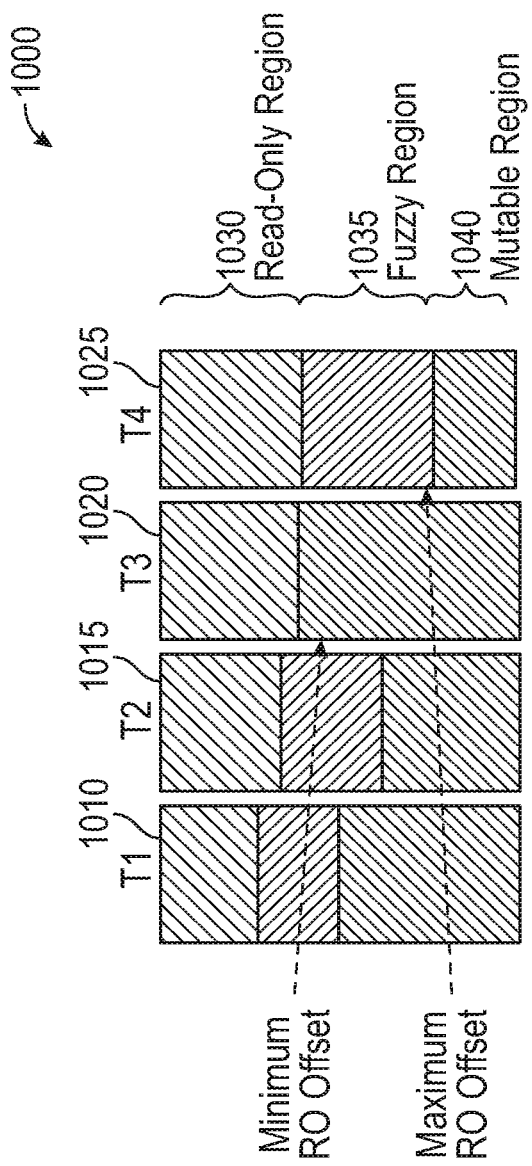

FIG. 10A

| Logical Address | Read-Modify-Write | CRDT Update | Blind Update |
|---|---|---|---|
| *Invalid* | Create a New Record at Tail-End | Create a New Record at Tail-End | |
| < *HeadAddress* | Issue Async IO Request | | |
| < *SafeReadOnlyAddress* | Add to Pending List | Create a Delta Record at Tail-End | Create a Delta Record at Tail-End |
| < *ReadOnlyAddress* | Create an Updated Record at Tail-End | | |
| < ∞ | Update in-Place Concurrently | Update in-Place Concurrently | Update in-Place Concurrently |

Table 2

```
 1  function Allocate(int size)
 2      offset = toffset.fetch_and_add(size);
 3      if offset + size < page_size then
 4          Return (tpage << page_size_bits) | offset;
 5      else if offset < page_size then
 6          buffer_maintenece (tpage++);
 7          index= tpage % buffer_size;
 8          spin-wait until closed-status[index == 'C';
 9          flush-status[index] = 'D'; closed-status[index] = 'O';
10          allocate (or clean) frame[index] for tpage;

11          if (offse + size) == page_size then
12              toffset.store(0);
13              return ((tpage - 1) << page_size_bits) | offset
            else
14
15              toffset.store(size);
16              return (tpage << page_size_bits)| 0;

17      else 18
19          spin-wait until toffset < page_size;
            return Allocate(size)

20  procedure buffer_maintenance(long tpage)
21      index = tpage % buffer_size;
22      if head_offset is lagging then
23          new_head = (tpage - buffer_size)<< page_size_bits;
24          adjust new_head based on flush-status;
25          old_head = head_offset;
26          head_offset.store(new_head);
27          bump_epoch(() =>
28              { close pages in range {old_head, new_head};});
29      if ro_offset is lagging then
30          ro_offset.store((tpage - ro_lag) << page_size_bits);
31          bump_epoch(() => {update_safe_ro(ro_offset}):

32  procedure update_safe_ro(long new)
33      old = safe_ro_offset;
34      safe_ro_offset = new;
35      foreach page ε (old, new) do
36          async_flush_page(page, callback : () => {flush-status[index] = 'F';}();
```

1115 → lines 2-3
1120 → line 5
1135 → line 19
1130 → line 31

FIG. 11A

```
1 function Status Read(key,input,output,ctx)
2       entry = find_tag(key);
3       laddr = trace_back_until(key,entry.address,head_offset)
4       if laddr is invalid then
5           return Status.Error;

6       else if laddr < head_offset then
7           Create context and issue async IO request to disk;
8           return Status.Pending 9       else
10          paddr = get_physical_address(laddr);
11          record = Obtain record at paddr;
12          if laddr < safe_ro_offset then
13              SingleReader (key,input, record.value, Output);

14          else
15              ConcurrentReader(key, input, record.value, output);

16          return Status.OK;
```

FIG. 12A

```
1 function Status Upsert(key,value,ctx)
2       entry = find_or_create_tag(key);
3       laddr = trace_back_until(key,entry.address,head_offset)
4       if laddr is invalid and laddr>read_only_offset then
5            paddr = get_physical_address(laddr);
6            record = Obtain recod at paddr;
7            ConcurrentWriter(key,record.value,value);
8            return Status.OK;
9       else
10           new_laddr = Allocate (size);
11           new_record = record at new_paddr;
12           write key,entry.address at new_record;
13           SingleWriter(key,new_record.value,value);
14           updated_entry = unset tentative bit,tag,new_laddr;
15           if entry.CAS(entry,updated_entry)then
16                return Status.OK;
17           else
18                new_record.invalid = true;
19                return Upsert(key,value,ctx);
```

FIG. 13A

```
 1 function Status RMW(key,input,ctx)
 2      entry = find_or_create_tag(key);
 3 1410 laddr = trace_back_until(key,entry.address,head_offset)
 4      if laddr is invalid then
 5          goto CREATE_RECORD;
 6      else if laddr < head_offset then
 7          create context and issue async IO request to disk;
 8          return Status.Pending;
 9      else
10          paddr = get_physical_address(laddr);
11          record = Obtain record at paddr;
12          if laddr < safe_ro_offset then
13              goto CREATE_RECORD;
14          else if laddr < ro_offset then
15              add context to pending list;
16              return Status.Pending;
17          else
18              InplaceUpdater (key,input,record.value);
19              return Status.OK;
20      CREATE_RECORD:
21      new_laddr = Allocate (size);
22      new_paddr = get_physical_address (new_laddr);
23      new_record = record at new_paddr;
24      write key,entry.address at new_record;
25      if laddr is invalid then
26          InitialUpdater (key,input,new_record.value);
27      else
28          CopyUpdater (key,input,record.value,new_record.value);
29      updated_entry = unset tentative bit,tag, new_laddr;
30      if not entry.CAS(entry,updated_entry)then
31          new_record.invalid = true;
32          return RMW(key,input,ctx);
33      return Status.OK;
```

FIG. 14A

KEY-VALUE STORE SYSTEM

BACKGROUND

Over the last decade, there has been a tremendous growth in data-intensive applications and services provided by networked processing resources commonly referred to as the cloud. Data is created on a variety of edge sources, e.g., devices, browsers, and servers, and processed by cloud applications to gain insights or take decisions. Applications and services either work on collected data, or monitor and process data in real time. These applications are typically update intensive and involve a large amount of state beyond what can fit in main memory.

SUMMARY

A system includes a processor and a memory storing multiple records in a key-value data structure and processor executable instructions for managing access to records in the key-value data structure. The instructions are executable to perform operations including managing a shared atomic epoch counter and thread epoch counters, determining a maximal safe epoch as a function of the shared atomic epoch counter and the thread epoch counters, maintaining a drain list of trigger actions, and triggering the trigger actions in the drain list as a function of an update of the shared atomic epoch counter and the maximal safe epoch.

A computer implemented method includes managing a shared atomic epoch counter and thread epoch counters for a key-value store system, accessing records stored in the key-value store system via threads, using a key based hash index to locate the records, determining a maximal safe epoch responsive as a function of the shared atomic epoch counter and the thread epoch counters, maintaining a drain list of trigger actions, and triggering the trigger actions in the drain list as a function of an update of the shared atomic epoch counter and the maximal safe epoch.

A machine-readable storage device has instructions for execution by a processor of a machine having main memory and storage to cause the processor to perform operations to perform a method. The operations include managing a shared atomic epoch counter and thread epoch counters for a key-value store system, accessing records stored in the key-value store system via threads, using a key based hash index to locate the records in a memory of the system, determining a maximal safe epoch responsive as a function of the shared atomic epoch counter and the thread epoch counters, maintaining a drain list of trigger actions, and triggering the trigger actions in the drain list as a function of an update of the shared atomic epoch counter and the maximal safe epoch.

BRIEF DESCRIPTION OF THE DRAWINGS

FIG. 10A is diagram illustrating thread views of markers tracking offsets into different regions according to an example embodiment.

FIG. 10B is a table illustrating update schemes for each of the different regions according to an example embodiment.

FIG. 11A is a representation of an algorithm for implementing a hybrid log according to an example embodiment.

FIG. 12A is a representation of an algorithm for implementing a find-tag procedure according to an example embodiment.

13B is a flowchart representation of a method for implementing a find_or_create_tag procedure according to an example embodiment.

FIG. 14A is a representation of an algorithm for implementing a trace_back_until procedure according to an example embodiment.

14B is a flowchart representation of a method for implementing a trace_back_until procedure according to an example embodiment.

14C is a representation of a create record method called by the trace_back_until procedure according to an example embodiment.

Figure 15:
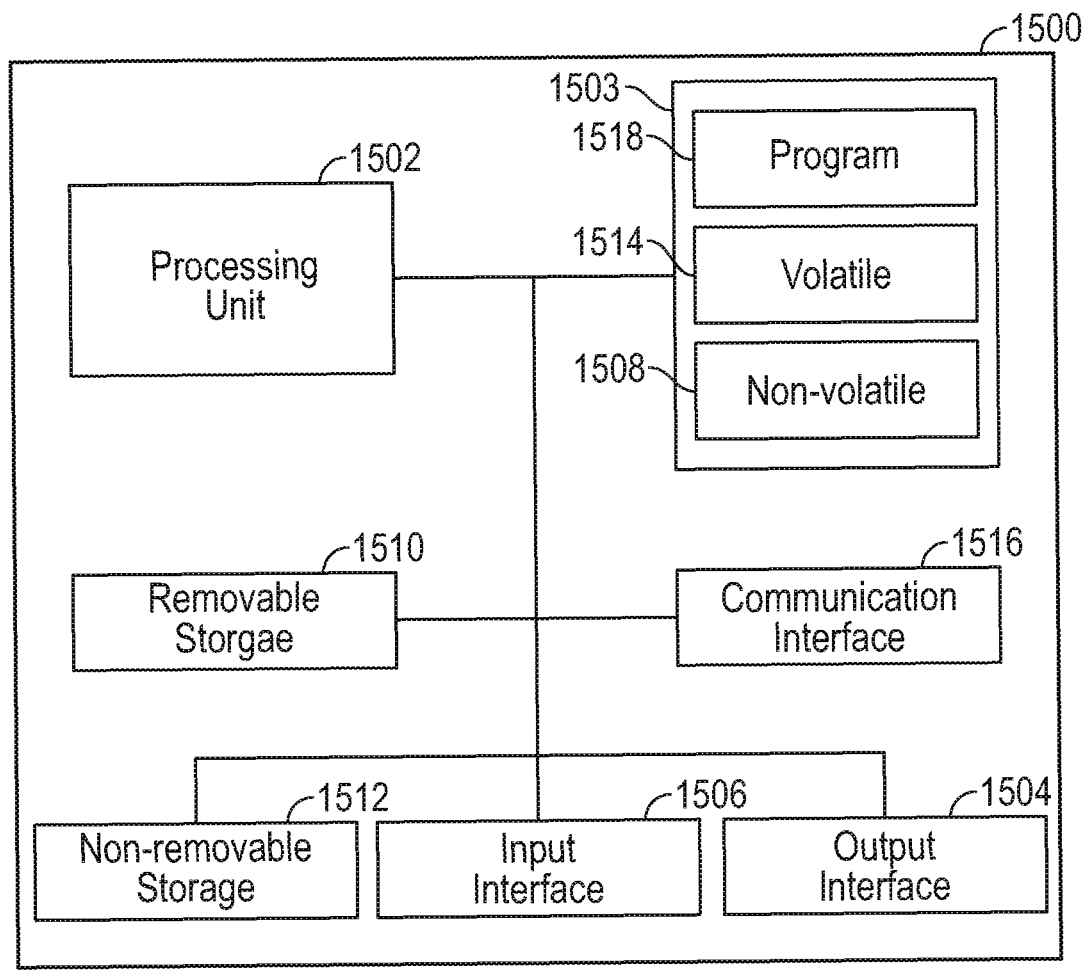

FIG. 15 is a block schematic diagram of a computer system to implement one or more example embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A key-value store system provides improvements to the performance and capacity of an in-memory database system. Real-time systems that work on collected data or that monitor and process data as it arrives, referred to as in real time, are typically update intensive and involve a large amount of state of the database beyond what can fit in main memory. However, such real-time systems display significant temporal locality in their access pattern.

State management is a significant challenge for data-intensive applications and exhibits several unique characteristics:

Large State: The amount of state accessed by some applications can be very large, far exceeding the capacity of main memory. For example, a targeted search ads provider may maintain per-user, per-ad and click through-rate statistics for billions of users. By retaining state that is infrequently accessed on secondary storage, a smaller amount of more expensive random access memory, and fewer machines may be used for the same workload.

Update Intensity: While reads and inserts are common, there are applications with significant update traffic. For example, a monitoring application receiving millions of CPU readings every second from sensors and devices may need to update a per-device aggregate for each reading.

Locality: Even though billions of state objects may be alive at any given point, only a small fraction is typically "hot" and accessed or updated frequently with a strong temporal locality. For instance, a search engine that tracks per-user statistics (averaged over one week) may have a billion users "alive" in the system, but only have a million users actively surfing at a given instant. Further, the hot set may drift over time; in our example, as users start and stop browsing sessions.

Point Operations: Given that state consists of a large number of independent objects that are inserted, updated, and queried, a system tuned for (hash-based) point operations (operations to access and update the same data points independent of other data points frequently, such as updating a pixel, or a sensor value from a sensor continuously sensing a parameter) is often sufficient. If range queries are infrequent, they can be served with simple workarounds such as indexing histograms of key ranges.

Analytics Readiness: Updates to state should be readily available for subsequent offline analytics; for e.g., to compute average ad click through-rate drift over time.

A prior solution adopted by many systems is to partition the state across multiple machines, and use pure in-memory data structures that are optimized for concurrency and support in-place updates—where data is modified at its current memory location without creating a new copy elsewhere—to achieve high performance. However, that solution is expensive and often severely under-utilizes the resources on each machine. For example, the ad serving platform of a major commercial search engine partitions its state across the main memory of 100s of machines, resulting in a per-machine request rate of less than 10,000 requests per second, which underutilizes computing resources. Further, pure in-memory data structures make recovery from failures complicated, and require additional work to make subsequent offline analytics possible.

Key-value stores are a popular alternative for state management. A key-value store is designed to handle larger-than-memory data and support failure recovery by storing data on secondary storage. Many prior key-value store systems are optimized for blind updates, reads, and range scans, rather than point operations and read-modify-write (RMW) updates such as per-key aggregates, which are prevalent in some applications, such as applications that handle point operations. Hence, these systems do not scale to more than a few million updates per second, even when the hot-set (a set of data currently being accessed frequently) fits entirely in main memory. Caching systems are usually optimized for point operations, but may be slow and depend on an external system such as a database or key-value store for storage and/or failure recovery. The combination of concurrency, in-place updates (in memory), and ability to handle data larger than memory is important for efficient state management in point operations; but these features are not simultaneously met by existing systems.

In various embodiments of the present inventive subject matter, a key value store that stores multiple records in a key-value data structure uses a shared atomic epoch counter and multiple thread epoch counters in a shared epoch table. The system determines a maximal safe epoch responsive as a function of the shared atomic epoch counter and the thread epoch counters. A drain list of trigger actions created by one or more threads is maintained. The trigger actions are executed as a function of the maximal safe epoch responsive to an update of the shared atomic epoch counter.

In further embodiments, the key-value store system combines a highly cache-optimized concurrent hash index with an allocator, such as a "hybrid log": a new concurrent log-structured record store that spans main memory and tiered storage in a single logical address space, while supporting fast in-place updates in memory.

The hybrid log offers a self-tuning data organization capability to support a potentially drifting hot set, without requiring any fine-grained statistics or meta-data. The system extends the standard key-value store interface to handle read-modify-writes, blind and CRDT-based updates by leveraging dynamic code generation to provide native support for advanced user-defined update types.

In addition to reads, two types of state updates are supported, blind updates, where an old value in a record is replaced by a new value blindly, and read-modify-writes (RMWs), where the value is atomically updated based on the current value and an input (optional). RMW updates, in particular, enable support of partial updates (e.g., updating a single field in the value) as well as mergeable aggregates (e.g., sum, count). Being a point-operations store, the system achieves an in-memory throughput of 100s of million operations per second.

Towards a scalable threading model standard epoch-based synchronization is enhanced to facilitate lazy propagation of global changes to all threads accessing records via trigger actions. The system provides threads accessing data with unrestricted access to memory under the safety of epoch protection.

A concurrent latch-free resizable cache-friendly hash index may also be used by the system. When coupled with a standard in-memory record allocator, the hash index serves as an in-memory key-value store.

Log-structuring is a well-known technique for handling data larger than memory and supporting easy failure recovery. Prior log-structuring techniques are based on the read-copy-update strategy, in which updates to a record are made on a new copy on the log. Such a design could limit throughput and scalability. In one embodiment, a new hybrid log seamlessly combines in-place updates with a traditional append-only log. An organization of the hybrid log allows performance of in-place updates of "hot" records and use read-copy-updates for colder records. Further, the hybrid log acts as an efficient cache by shaping what resides in memory without any per-record or per-page statistics.

The system follows a design philosophy of making the common case fast. By carefully (1) providing fast point-access to records using a cache-efficient concurrent latch-free hash index; (2) choosing when and how, expensive or uncommon activities (such as index resizing, checkpointing, and evicting data from memory) are performed; and (3) allowing threads to perform in-place updates most of the time, the system exceeds the throughput of pure in-memory systems for in-memory workloads, while supporting data larger than memory and adapting to a changing hot set.

In one embodiment, the system may be implemented as a high-level-language component using dynamic code generation. The system blurs the line between traditional key-value stores and update-only "state stores" used in streaming systems. The system may provide high update rates, low cost by limiting the memory footprint, support for larger-than-memory data with efficient working-set tracking, and performance that exceeds pure in-memory data structures when the working-set fits in memory.

In one embodiment, the system is a concurrent latch-free key-value store that is designed for high performance and scalability across threads. Latch-free atomic operations such as compare-and-swap (CAS), fetch-and-add, and fetch-and-increment are used by the system. CAS compares a given value to that at the location and swaps to a desired value atomically (all or nothing). Fetch-and-add adds a given value to the value at the location and returns the original value. Similarly, fetch-and-increment atomically increments the value at the give location. The system also leverages an extended epoch-based synchronization framework to help support in-place updates.

Figure 1:
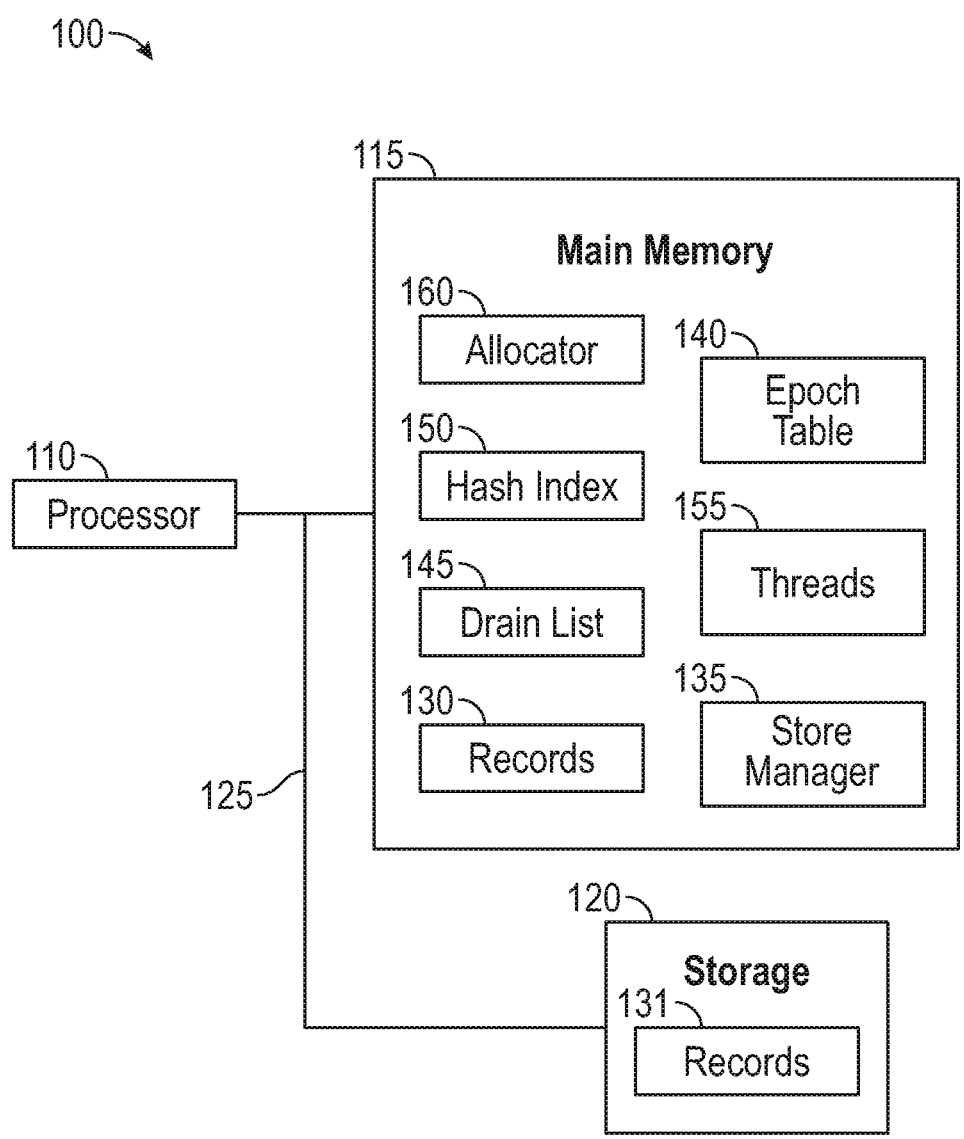
FIG. 1 is a block diagram a key-value data store system according to an example embodiment.

FIG. 1 is a block diagram a key-value data store system 100. In one embodiment, the system 100 includes a processor 110 coupled to a main memory 115 for storing multiple modules and data for use by the processor 110. A storage device 120, such as a disk drive, is also coupled via a data bus 125 to the processor and main memory 115. Memory 115 and storage 120 are used to store multiple records in a key-value data structure 130, 131. In one embodiment, the records may be stored in a single logical address space that spans both the memory 115 and storage 120.

The processor 110 executes instructions, shown as store manager 135 for managing access to records in the key-value data structure 130, 131. An epoch table 140 is used to manage multiple thread epoch counters.

In one embodiment, a global CurrentEpoch value corresponding to a shared atomic epoch counter starts at 1, and is only incremented when necessary. The epoch table 140 includes all per-thread counters. Each entry in this table is cache-line-sized so there is no contention across threads. These thread-local counters are by default set to zero (which stands for "unassigned").

When a thread first registers itself with the system, the thread is assigned an entry from the epoch table 140, and copies over the global CurrentEpoch value to its thread-local copy using a compare-and-swap. Subsequently, each time the thread refreshes its epoch, it updates its thread-local counter to the current global value of CurrentEpoch.

A thread eventually de-registers itself by simply setting its epoch table counter entry to zero. The epoch table can be scanned to determine the safe-to-reclaim epoch (this is equal to one less than the minimum of all the non-zero entries in the table), and therefore issue the corresponding trigger actions as required by the protocol. The global CurrentEpoch value is incremented whenever the system needs to coordinate any global action in the system, such as memory-safe garbage collection, index resizing, circular buffer maintenance and page flushing, shared log page boundary maintenance, and checkpointing.

The system 100 determines a maximal safe epoch as a function of the shared atomic epoch counter and the thread epoch counters.

A list of trigger actions that may be generated by threads accessing records is shown as a drain list 145. The trigger actions are triggered as a function of an update of the shared atomic epoch counter and the maximal safe epoch. The drain list 145 of trigger actions comprises thread generated trigger actions and includes epoch, action pairs. Triggering the trigger actions comprises performing an atomic compare-and-swap on the drain list to ensure a trigger actions is executed exactly once.

A thread may be configured to acquire an entry in the drain list, refresh the thread epoch counter to the shared atomic epoch counter, increment the shared atomic epoch counter and add a trigger action to the drain list, and release an entry from the shared epoch table.

In one embodiment, the memory includes a hash-based index 150 used to access data in the key-value data structure 130, 131 via a key in a request by a thread 155. An allocator 160 that allocates records to memory via use of the hash-based index 150. The allocator may comprise one or more of an in-memory allocator, an append-only-log, and a hybrid-log. The hybrid-log divides memory into a hot portion on which in-place updates are performed and a cold portion on which read-copy-updates are performed.

Figure 2:
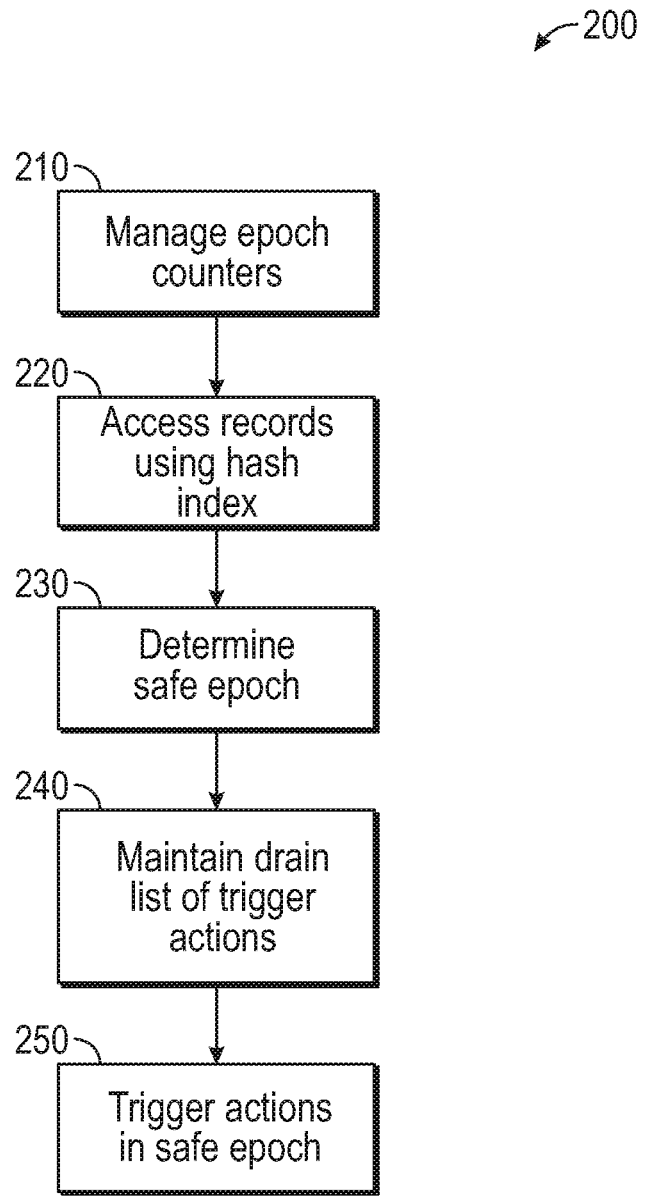
FIG. 2 is a flowchart illustrating a method implemented by the key-value data store system to provide access to data by multiple threads while ensuring persistence of the data records according to an example embodiment.

FIG. 2 is a flowchart illustrating a method 200 implemented by system 100 to provide access to data by multiple threads while ensuring persistence of the data records and fast access. Method 200 manages a shared atomic epoch counter and multiple thread epoch counters at operation 210 in a shared epoch table for a key-value store system. Operations 220 provides access to records stored in the key-value store system via threads, using a key based hash index to locate the records. Operations 230 determine a maximal safe epoch responsive as a function of the shared atomic epoch counter and the thread epoch counters. Method 200 maintains a drain list of trigger actions at operations 240. The trigger actions in the drain list are triggered for execution at operations 250 as a function of an update of the shared atomic epoch counter and the maximal safe epoch.

Figure 3:
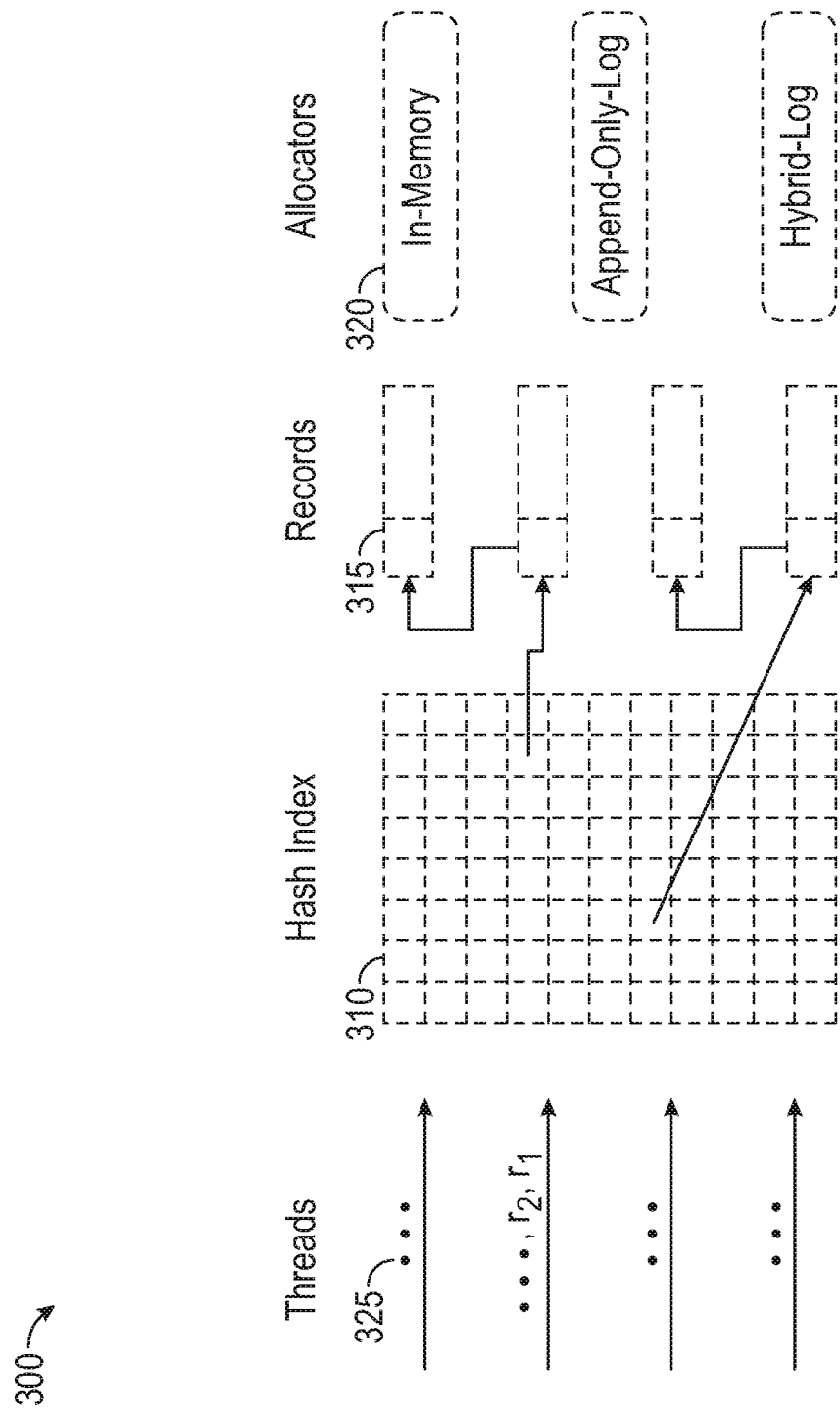
FIG. 3 is a block diagram representation of an overall architecture of the key-value data store system according to an example embodiment.

FIG. 3 is a block diagram representation of an overall architecture 300 of system 100. A hash index 310 holds pointers to key-value records 315. A record allocator 320 that allocates and manages individual records 315. Threads 325 are used to access the records 315. The index 310 provides very efficient hash-based access to hash buckets. The hash bucket is a cache-line sized array of hash bucket entries. Each entry includes some metadata and an address (either logical or physical) provided by the record allocator 320. The record allocator 320 stores and manages individual records. Hash collisions that are not resolved at the index level are handled by organizing records as a linked-list. Each record consists of a record header, key, and value. Keys and values may be fixed or variable-sized. The header contains some metadata and a pointer to the previous record in the linked-list. Note that keys are not part of the hash index 310, unlike many traditional designs.

Architecture 300 reduces the in-memory footprint of the hash index, allowing us to retain it entirely in memory. Retaining the entire key-set in main memory is impractical in some use-cases. Architecture 300 also separates user data and index metadata, which allows mixing and matching the hash index with different record allocators.

Three allocators may be used. An in-memory allocator enables latch-free access and in-place updates to records. An append-only log-structured allocator provides latch-free access and can handle data larger than main-memory, but without in place updates. A novel hybrid-log allocator combines latch-free concurrent access with in-place updates and the ability to handle larger-than-memory data.

In addition to the standard get-put interface supported by key-value stores, system 100 supports advanced user-defined updates. Dynamic code generation, described in detail below, is used to integrate the update logic provided as user-defined delegates during compile time into the store, resulting in a highly efficient store with native support for advanced updates. In one embodiment, a generated runtime interface consists of the following operations:

Read: Read the value corresponding to a key.

Upsert: Replace the value corresponding to a key with a new value blindly (i.e. regardless of the existing value). Insert as new, if the key does not exist.

RMW: Update the value of a key based on the existing value and an input (optional) using the update logic provided by the user during compile-time, a Read-Modify-Write (RMW) operation. The user also provides an initial value for the update, which is used when a key does not exist in the store. Additionally, users can indicate that an RMW operation is mergeable, for conflict-free replicated datatype during compile time. Such a data type can be computed as partial values that can later be merged to obtain the final value. For example, a summation-based update can be computed as partial sums and these can be summed up for the final value.

Delete: Delete a key from the store.

Further, some operations may go pending for various reasons. The system returns a PENDING status in such cases; threads issue a CompletePending request periodically to process outstanding pending operations related to that thread.

Epoch Protection Framework

In one embodiment, the system is scalable and avoids expensive coordination between threads in the common fast access path. Threads perform operations independently with no synchronization most of the time. At the same time, the threads agree on a common mechanism to synchronize on shared system state. To achieve these goals, multi-threaded epoch protection is used to enable lazy synchronization over arbitrary global actions.

The system maintains a shared atomic counter E, called the current epoch, that can be incremented by any thread. Every thread T has a thread-local version of E, denoted by $E_T$. Threads refresh their local epoch values periodically. All thread-local epoch values $E_T$ are stored in a shared epoch table 140, with one cache-line per thread. An epoch c is said to be safe, if all threads have a strictly higher thread-local value than c, i.e., $\forall$ T: $E_T > c$. Note that if epoch c is safe, all epochs less than c are also safe. A global counter $E_s$, is maintained and tracks the current maximal safe epoch. $E_s$ is computed by scanning all entries in the epoch table 140 and is updated whenever a thread refreshes its epoch. The system maintains the following invariant: $\forall$ T: $E_s < E_T \leq E$.

Trigger Actions: The basic epoch framework is augmented with the ability to execute arbitrary global actions when an epoch becomes safe using trigger actions. When incrementing the current epoch, say from c to c+1, threads can additionally associate an action that will be triggered by the system at a future instant of time when epoch c is safe. This is enabled using the drain-list 145, a list of (epoch, action) pairs, where action is the callback code fragment that must be invoked after epoch is safe. The drain list 145 is implemented using a small array that is scanned for actions ready to be triggered whenever $E_s$ is updated. An atomic compare-and-swap operation is used on the drain list 145 array to ensure an action is executed exactly once. $E_s$ is recomputed and the drain-list 145 is scanned through responsive to a change in current epoch, to enhance scalability.

Using the Epoch Framework: The epoch protection framework is exposed using the following four operations that can be invoked by any thread T:

Acquire: Reserve an entry for T and set ET to E

Refresh: Update ET to E, Es to current maximal safe epoch and trigger any ready actions in the drain-list BumpEpoch(Action): Increment counter E from current value c to (c+1) and add (c, Action) to drain-list Release: Remove entry for T from epoch table Epochs with trigger actions can be used to simplify lazy synchronization in parallel systems. Consider a canonical example, where a function, active-now, is invoked responsive to a shared variable status being updated to active. A thread updates status to active atomically and bumps the epoch with active-now as the trigger action. Not all threads will observe this change in status immediately. However, all of the threads are guaranteed to have observed the change in status responsive to the threads refreshing their epochs (due to sequential memory consistency using memory fences). Thus, active-now will be invoked only after all threads see the status to be active and hence is safe.

The epoch framework is used to coordinate system operations such as memory-safe garbage collection, index resizing, circular buffer maintenance and page flushing, shared log page boundary maintenance, and checkpointing, while at the same time providing threads unrestricted latch-free access to shared memory locations in short bursts for user operations such as reads and updates.

Lifecycle of a Fast Thread: As a running example, the system implements a count store, in which a set of user threads increment the counter associated with incoming key requests. A thread calls Acquire to register itself with the epoch mechanism. Next, the thread issues a sequence of user operations, along with periodic invocations of Refresh (e.g., every 256 operations) to move the thread to current epoch, and CompletePending (e.g., every 64K operations) to handle any prior pending operations. Finally, the thread calls Release to deregister itself from using Fast.

Hash Index: The hash index 150 is a concurrent, latch-free, scalable, and resizable hash-based index in one embodiment. The hash index works with the record allocator 160 that returns logical or physical memory pointers. In one example, the system comprises a 64-bit machine with at most 63-bit addresses, and 64-byte cache lines. In some embodiments, the index may be paired with different allocators 160 to create key-value stores with increasing capabilities.

Figure 4:
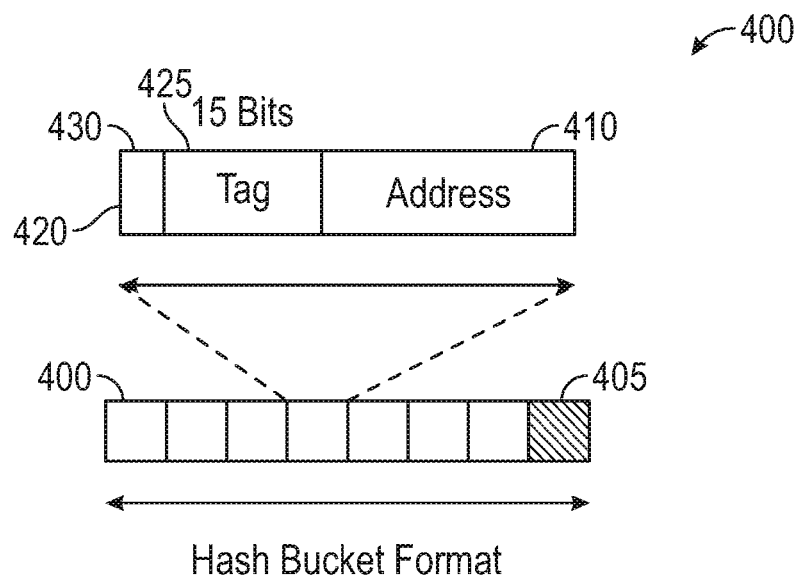
FIG. 4 is an illustration of a hash index according to an example embodiment.

The hash index 150 may comprise a cache-aligned array of hash buckets as shown at 400 in FIG. 4. The array may be allocated in sizes that are powers of 2. Each hash bucket 400 is 64 bytes in length, the size of a cache line. A bucket 400 consists of seven 8-byte hash bucket entries and one 8-byte entry to serve as an overflow bucket 405 pointer. Each overflow bucket 405 is 64 bytes in length, cache-aligned like the primary hash buckets, and allocated on demand using an in-memory allocator. The choice of 8-byte entries allows latch-free operation on the entries using 64-bit atomic compare-and-swap operations.

On a 64-bit machine, physical addresses typically take up fewer than 64 bits, such as 48 bits as indicated at 410 in a blown-up view of one of the buckets at 420. Additional bits may be used for index operations. Pointers up to 63 bits long may be used.

Each hash bucket entry 420 consists of three parts: a tag (15 bits) at 425, a tentative bit 430, and the address (48 bits) 410. An entry with value 0 (zero) indicates an empty slot. In an index with 2 k hash buckets, the tag may be used to increase the effective hashing resolution of the index from k bits to k 15 bits, which improves performance by reducing hash collisions. The hash bucket for a key with hash value his first identified using the first k bits of h, called the offset of h. The next 15 bits of h are called the tag of h. Tags only serve to increase the hashing resolution and may be smaller, or removed entirely, depending on the size of the address. The tentative bit is used for insert operations as described in further detail below.

Figure 5:
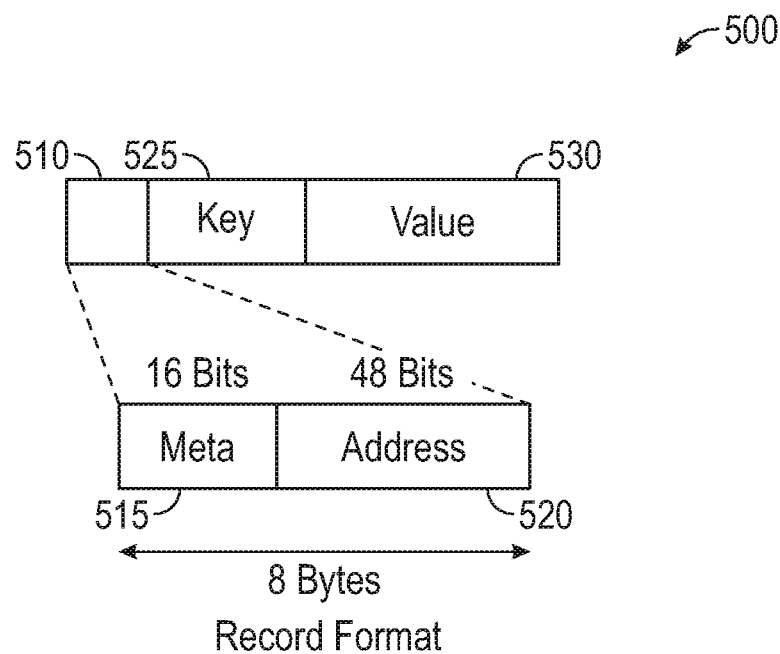
FIG. 5 is an illustration of a record format according to an example embodiment.

A record format is illustrated at 500 in FIG. 5. A header 510 includes a 16 bit meta data field 515, and a 48 bit address 520. The record format also includes a key field 525, and a value 530. The value 530 corresponds to the data in the record that may be accessed for reading or updating or both.

Index Operations: The hash index 150 is based on the invariant that each (offset, tag) has a unique index entry, which points to the set of records whose keys hash to the same offset and tag. Ensuring this invariant while supporting concurrent latch-free reads, inserts and deletes of index entries is challenging.

Finding and Deleting an Entry: Locating the entry corresponding to a key is straightforward. The hash-bucket is identified using k hash bits and scanning through the bucket to find an entry that matches the tag. Deleting an entry from the index uses compare-and-swap to replace the matching entry (if any) with zero.

Inserting an Entry: Consider the case where a tag does not exist in the bucket, and a new entry is to be inserted. A naive approach is to look for an empty entry and insert the tag using a compare-and-swap. However, two threads could concurrently insert the same tag at two different empty slots in the bucket, breaking our invariant.

Figures 6A, 6B:
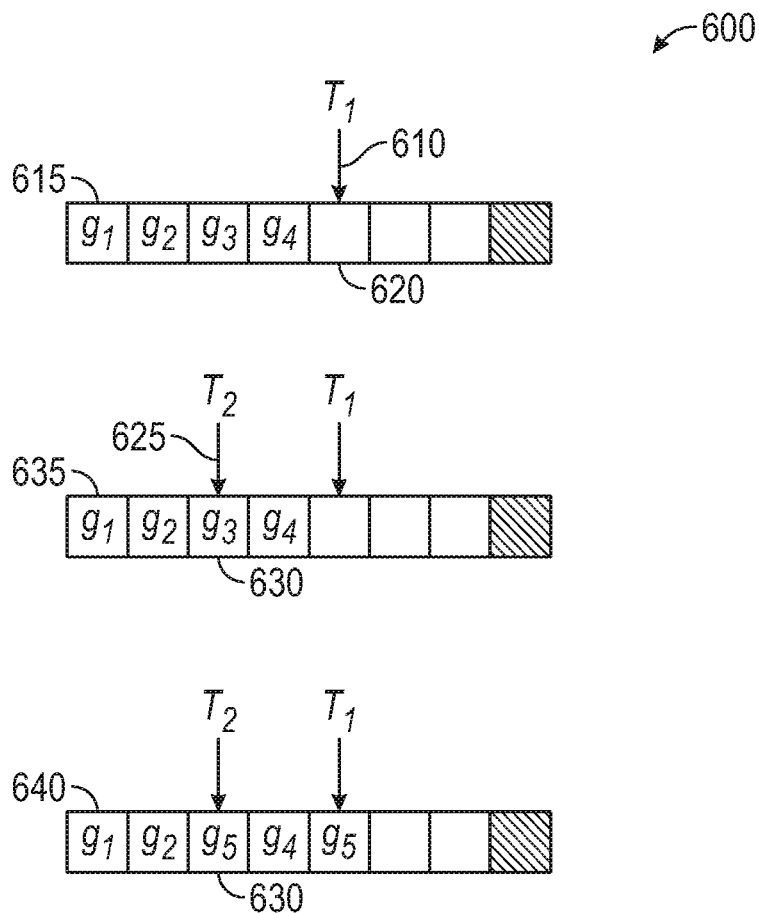
FIG. 6A is an illustration of threads competing for empty entries in a bucket according to an example embodiment.
FIG. 6B is an illustration the of use of a latch-free two-phase insert algorithm by threads according to an example embodiment.

As a workaround, consider a solution where every thread scans the bucket from left to right, and deterministically chooses the first empty entry as the target. The threads will compete for the insert using compare-and-swap and only one will succeed. Even this approach violates the invariant in presence of deletes, as shown in FIG. 6A where a thread T1 610 scans a bucket 615 from left to right and chooses slot 5 620 for inserting tag g5. Another thread T2 625 deletes tag g3 from slot 3 630 in the same bucket shown at 635, and then tries to insert a key with the same tag g5 in the same bucket 630 as shown at 640. Scanning left to right will cause thread T2 625 to choose the first empty entry 3 630 for this tag. It can be shown that this problem exists with any algorithm that independently chooses a slot and inserts directly: to see why, note that just before thread T1 does a compare-and-swap, it may get swapped out and the database state may change arbitrarily, including another slot with the same tag.

While locking the bucket is a possible (but heavy) solution, system 100 uses a latch-free two-phase insert algorithm illustrated at 650 in FIG. 6B that leverages the tentative bit entry. A thread finds an empty slot and inserts the record with the tentative bit set. Entries with a set tentative bit are deemed invisible to concurrent reads and updates. The bucket is rescanned (note that the bucket already exists in cache) to check if there is another tentative entry for the same tag; if yes, the thread backs off and retries. Otherwise, the tentative bit is reset to finalize the insert. Since every thread follows this two-phase approach, the index is guaranteed to be invariant. FIG. 6B illustrates the ordering of operations by two threads, T1 at 655 and T2 at 660. There exists no interleaving that could result in duplicate non-tentative tags.

Resizing and Checkpointing the Index: For applications where the number of keys may vary significantly over time, resizing the index on-the-fly is supported. Epoch protection and a state machine of phases is leveraged to perform resizing at low overhead as described in further detail below. Interestingly, the use of latch-free operations always maintains the index in a consistent state even in the presence of concurrent operations. This allows performance of an asynchronous fuzzy checkpoint of the index without obtaining read locks, greatly simplifying recovery.

In one embodiment, a complete in-memory key-value store utilizes the hash index 150 along with a simple in-memory allocator 160 such as jemalloc. Records with the same (offset, tag) value are organized as a reverse singly-linked-list. The hash bucket entry 405 points to the tail (most recent record) in the list, which in turn points to the previous record, and so on. Each record 500 may be fixed or variable-sized, and consists of a 64-bit record header, the key, and the value. Apart from the previous pointer, several bits are used to keep track of other information for use with log-structured allocators 160. These bits are stored as part of the address word, but may be stored separately.

Operations with In-Memory Allocator: User threads read and modify record values in the safety of epoch protection, with record-level concurrency handled by the user's read or update logic. For example, one could use fetch-and-add for counters, take a record-level lock, or leverage application-level knowledge of partitioning for latch-free updates. Operations on the store are described next.

Reads: A matching tag entry from the index is found and the linked-list is traversed for that entry to find a record with the matching key.

Updates and Inserts: Both blind updates (upserts) and RMW updates begin by finding the hash bucket entry for the key. If the entry does not exist, a two-phase algorithm is used to insert the tag along with the address of the new record, into an empty slot in the hash bucket. If the entry exists, the linked-list is scanned to find a record with a matching key. If such a record exists, the operation is performed in-place. A thread has guaranteed access to the memory location of a record, as long as the thread does not refresh its epoch. This property allows threads to update a value in-place without worrying about memory safety. If such a record does not exist, the new record is spliced into the tail of the list using a compare-and-swap. In the count store example, the counter value is incremented for an existing key, using either a fetch-and-increment or a normal in-place increment (if keys are partitioned). The initial value for the insert of a new key is set to 0.

Deletes: A record is deleted by atomically splicing the record out of the linked-list using a compare-and-swap on either a record header or hash bucket entry (for the first record). When deleting the record from a singleton linked-list, the entry is set to 0, making it available for future inserts. A deleted record cannot be immediately returned to the memory allocator 160 because of concurrent updates at the same location. The epoch protection framework is used to solve this problem. Each thread maintains a thread-local (to avoid a concurrency bottleneck) free-list of (epoch, address) pairs. When the epochs become safe, we can safely return the deleted record to the allocator.

Handling larger data: A log-structured record allocator may be used to enable the key-value store system to handle data larger than memory by building an augmented log-structured record allocator. In one embodiment, the log-structured record allocator is augmented with epoch protection for lower synchronization overhead. Scalable performance may be obtained using a novel hybrid log allocator described below.

Figure 7:
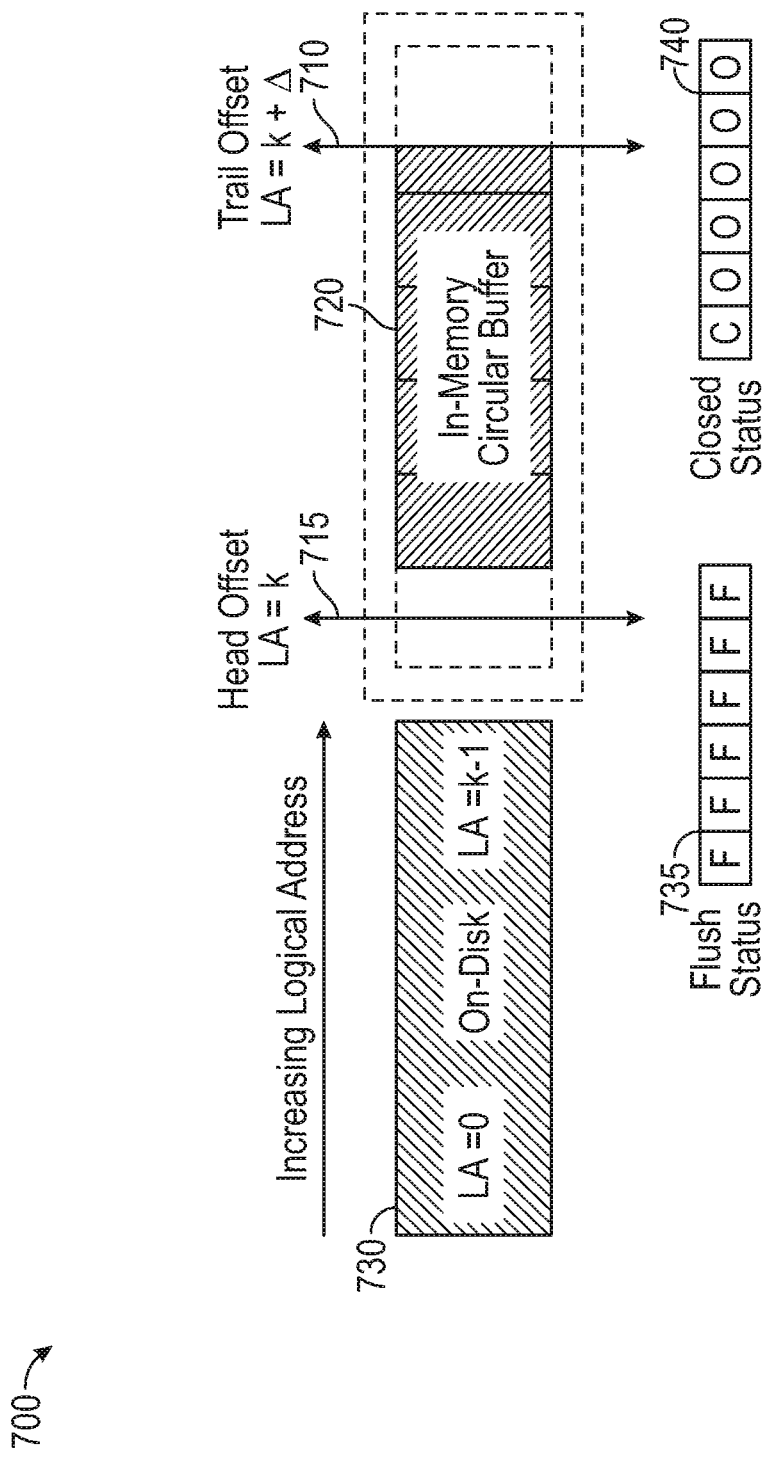
FIG. 7 is a representation of a logical address space spanning main memory and secondary storage according to an example embodiment.

Logical Address Space: In one embodiment, a global logical address space is defined that spans main memory and secondary storage. FIG. 7 is a representation of the logical address space at 700. The record allocator allocates and returns 48-bit logical addresses corresponding to locations in this address space. Unlike a pure in-memory allocator version, the hash index 150 now stores the logical address of a record instead of its physical address. The logical address space 700 is maintained using a tail offset 710, which points to the next free address at the tail of the log. An additional offset, called the head offset 715, tracks the lowest logical address that is available in memory. The head offset 715 is maintained at an approximately constant lag from the tail offset 710, equal to the memory available for the log. In order to minimize overhead, we update it only when the tail offset 710 crosses page boundaries.

The contiguous address space between the current head and tail offsets (i.e., the tail portion of the log) is present in a bounded in-memory circular buffer 720. The circular buffer 720 is a linear array of fixed-size page frames, each of size 2F bytes, that are each allocated sector-aligned with the underlying storage device 730, in order to allow unbuffered reads and writes without additional memory copies. A logical address L greater than the head address resides in main memory at offset equal to the last F bits of L, in the page frame with position equal to L»F in the circular array.

New record allocation happens at the end of the tail. The tail offset is maintained as two values—a logical page number and an offset. For efficiency, a thread allocates memory using a fetch-and-add on the offset; if the offset corresponds to an allocation that would not fit on the current page, it increments the page number and resets the offset. Other threads that see a new offset greater than page size wait for the offset to become valid, and retry.

Circular Buffer Maintenance: Off-loading of log records to secondary storage 730, 120 is managed in a latch-free manner, as threads perform unrestricted memory accesses between epoch boundaries. Two status arrays are maintained: a flush-status array 735 tracks if the current page has been flushed to secondary storage, and a closed-status 740 array determines if a page frame can be evicted for reuse. Since the system appends to the log, a record is immutable once created. When the tail enters a new page p+1, the epoch is bumped with a flush trigger action that issues an asynchronous I/O request to flush page p to secondary storage 730. This action is invoked only when the epoch becomes safe—because threads refresh epochs at operation boundaries, it is guaranteed that all threads would have completed writing to addresses in page p, and the flush is safe. When the asynchronous flush operation completes, the flush-status of the page is set to flushed.

As the tail grows, an existing page frame may need to be evicted from memory, but first the system ensures that no thread is accessing the page. Traditional databases use a latch to pin pages in the buffer pool before every access so that it is not evicted when in use. For high performance, epochs are leveraged to manage eviction. Recall that the head offset determines if a record is available in memory. To evict pages from memory, the head offset is incremented and the current epoch is bumped with a trigger action to set the closed-status array entry for the older page frame. When this epoch is safe, it is known that all threads would have seen the updated head offset value and hence would not be accessing those memory addresses. It is ensured that the to-be-evicted page is completely flushed before updating the head offset so that threads that need those records can retrieve it from storage.

Operations with Append-Only Allocator: Blind updates simply append a new record to the tail of the log and update the hash index using a compare-and-swap as before. If the operation fails, the log record is marked as invalid (using a header bit) and retry the operation. Deletes insert a tombstone record (again, using a header bit), and use log garbage collection such as described below. Read and RMW operations are similar to their in-memory, counterparts. However, updates are always appended to the tail of the log, and linked to the previous record. Further, logical addresses are handled differently. For a retrieved logical address, the system first checks if the address is more than the current head offset. If yes, the record is in memory and the system proceeds as before. If not, an asynchronous read request is issued for the record to storage. Being a record log, the record may be retrieved without retrieving the entire logical page. In the count store example, every counter increment results in appending the new counter to the tail of the log (reading the older value from storage if necessary), followed by a compare-and-swap to update the index entry.

User operations are associated with a context that is used to continue the operation when the I/O completes. Each Fast thread has a thread-local pending queue of contexts of all completed asynchronous requests issued by that thread. Periodically, the thread invokes a CompletePending function to dequeue these contexts and process the continuations. Note that the continuation may need to issue further I/O operations, e.g., for a previous logical address in the linked-list of records.

Enabling in-place updates in fast: The log allocator design, in addition to handling data larger than memory, enables a latch-free access path for updates due to its append-only nature. But this comes at a cost: every update involves atomic increment of the tail offset to create a new record, copying data from previous location and atomic replace of the logical address in the hash index. Further, an append-only log grows fast, particularly with update-intensive workloads, quickly making disk I/O a bottleneck.

On the other hand, in-place updates have several advantages in such workloads: (1) frequently accessed records are likely to be available in higher levels of cache; (2) access paths for keys of different hash buckets do not collide; (3) updating parts of a larger value is efficient as it avoids copying the entire record or maintaining expensive delta chains that require compaction; and (4) most updates do not need to modify the Fast hash index.

In one embodiment, an enhanced log, referred to as a hybrid log comprises a data structure that combines in-place updates (in memory) and log-structured organization (on disk) while providing latch-free concurrent access to records. Hybrid log spans memory and secondary storage, where the in-memory portion acts as a cache for hot records and adapts to a changing hot set.

Figures 8A, 8B:
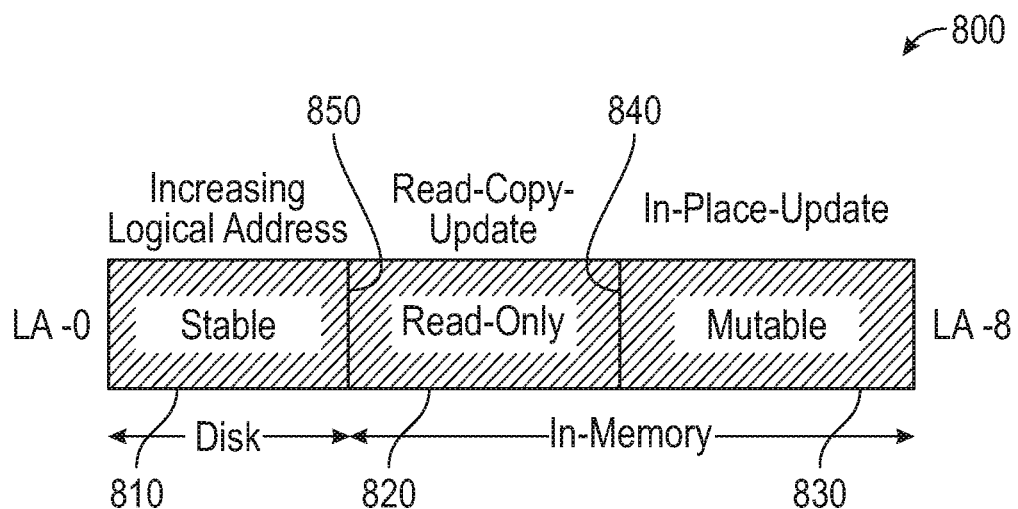
FIG. 8A is an illustration of a logical division of address space into three contiguous regions with different access characteristics according to an example embodiment.
FIG. 8B is a table illustrating update schemes for the different contiguous regions according to an example embodiment.

In hybrid log the logical address space is divided into 3 contiguous regions: (1) stable region 810 (2) read-only region 820 and (3) mutable region 830 as shown in FIG. 8A at 800. The stable region 810 is the part of logical address (LA) space that is on secondary storage, starting with a logical address of zero in one embodiment. The in-memory portion is composed of read-only 820 and mutable 830 regions. Records in the mutable region 830 can be modified in-place, while records in the read-only region 820 cannot.

In order to update a record currently in the read-only region, a Read-Copy-Update (RCU) strategy is followed: a new copy is created in the mutable region 830 and then updated. Further updates to such a record are performed in-place, as long as the record stays in the mutable region 830.

Hybrid log may be implemented on the log allocator 160 using an additional marker called the read-only offset 840, that corresponds to a logical address residing in the in-memory circular buffer 720. The region between head-offset 850 and read-only offset is the read-only region and the region after read-only offset is the mutable region. If a record is at a logical address more than read-only offset 840, it is updated in-place. If the address is between read-only and head offset 840 and 850, an updated copy is created at the end of tail and the hash index is updated to point to the new location; if the address is less than head-offset 840, it is not available in memory and hence an asynchronous IO request is issued to retrieve the record from secondary storage. Once the record is obtained from secondary storage, a new updated copy of the record is created at the end of tail followed by updating the hash index. This update scheme is summarized in Table 1 in FIG. 8B.

The read-only offset is maintained at a constant lag from the tail-offset and is updated only at page boundaries similar to the headoffset. Since none of the pages with logical address less than the read-only offset are being updated concurrently, it is safe to flush them to secondary storage. As tail-offset grows, read-only offset shifts along making pages ready to be flushed. Once they are safely offloaded to disk, they can be evicted from the circular buffer (when necessary) using the head-offset and closed-status array. Thus, the read-only offset serves as a light-weight indicator of pages that are ready to be flushed to disk. Note that the read-only offset in the hybrid log enables latch-free access to records in the mutable region, whereas in traditional designs, records (or pages) must be pinned in the buffer pool before updating it to prevent concurrent updates while flushing them to disk.

The lag between read-only and tail offsets determines the division of main memory buffer capacity into fast in-place updatable and immutable read-only regions. In addition to helping flush pages safely to secondary storage, the read-only region also acts as a second-chance cache for records before being off-loaded to disk.

Figure 9:
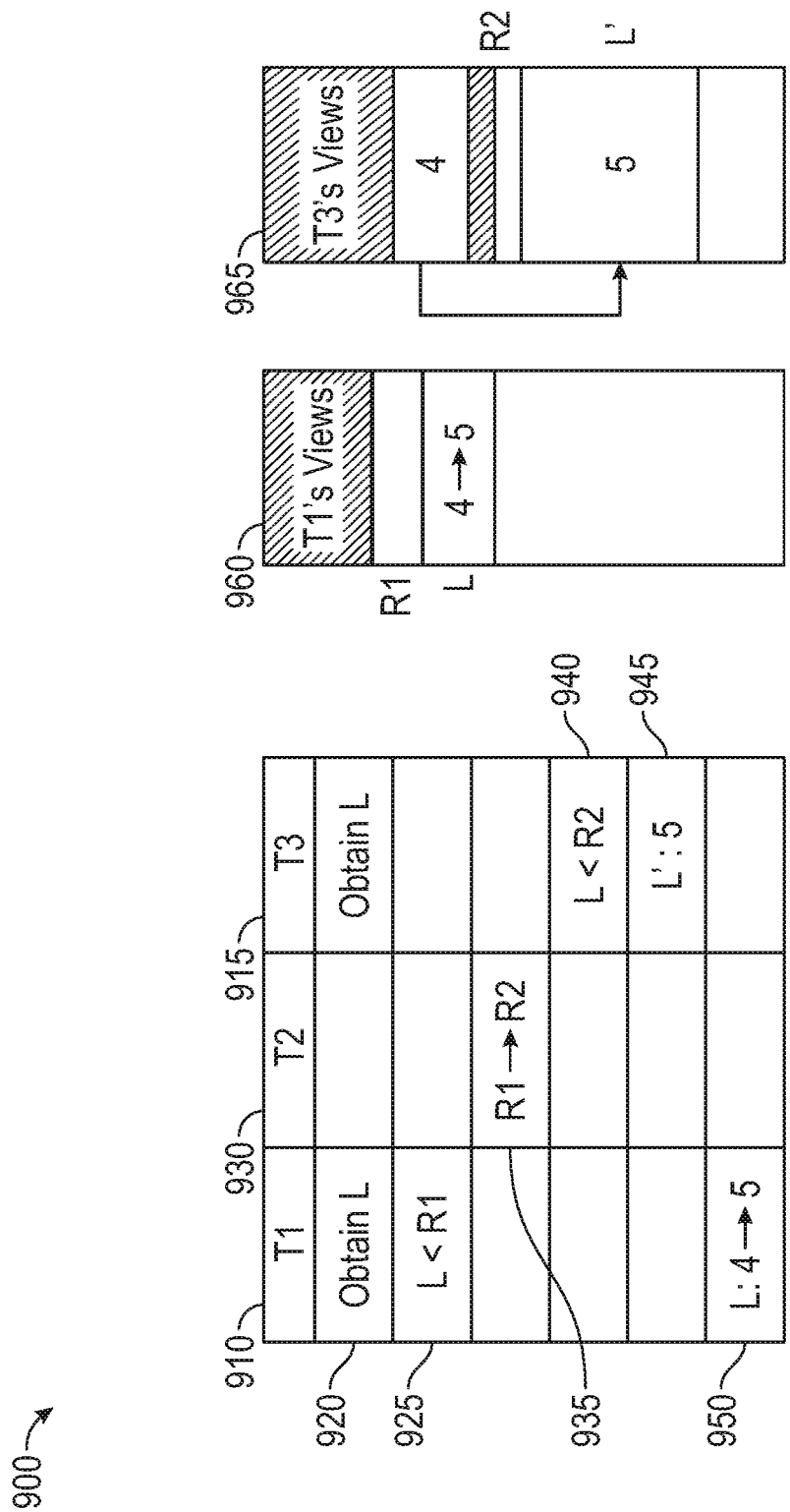
FIG. 9 illustrates an anomaly in updating a value according to an example embodiment.

Lost-Update Anomaly: In one embodiment, the read-only offset is updated and read atomically. However, it is still possible that a thread decides on the update scheme based on a stale value of the offset, leading to incorrect execution. FIG. 9 illustrates the anomaly at 900 based on a count store example. Threads T1 910 and T3 915 obtain the same logical address L from the Fast hash index at 920. T1 910 decides to do an in-place update as L is more than the current read-only offset R1 at 925. Meanwhile, a thread T2 930 updates the read-only offset from R1 to R2 at 935 due to shifting of tail-offset. Now, thread T3 915 compares L with R2 at 940 and decides to create a new record at L' with the updated value of 5 at 945. However, thread T1 910 updates the value to 5 at L at 950. All future accesses will use the value at L' and hence we have lost the update by T1 910.

The above anomaly 900 occurs because a thread T2 930 updates read-only offset, while T1 910 is acting based on the current value. While this can be prevented by obtaining a read lock on read-only offset for the entire duration of T1's operation, such a locking scheme is expensive and unnecessarily delays shifting of read-only offset, which is integral to maintaining the circular buffer. On the other hand, even if the read-only offset has shifted, the anomaly occurs because one thread (T1) makes an update decision based on a stale value and another (T2) based on the new value of the offset. The respective views of T1 and T3 are shown at 960 and 965 respectively.

In one embodiment, another marker called the safe read-only offset may be used to eliminate such incorrect executions. This marker tracks the read-only offset that has been seen by all the threads. The marker is designed based on the following invariant: safe read-only offset is the minimum value of read-only offset seen by any active Fast thread. The marker is maintained using the epoch-trigger action mechanism as follows: whenever the read-only offset is updated, the current epoch is bumped along with a trigger action that updates the safe read-only offset to the new value. This epoch-based update for safe read-only offset satisfies the invariant because all threads that crossed the current epoch must have seen the new value of read-only offset.

With an additional marker, the safe read-only offset, the hybrid log is divided into 4 regions. The region between safe read-only and read-only offset is designated as fuzzy region, because some threads might see it as after the read-only offset while some other threads may see it as before. Threads are guaranteed to obtain the latest values of safe read-only and read-only offsets only when they refresh their epochs. As a result, each thread might have a thread-local view of these markers as shown in FIG. 10A at 1000. The views of four threads, T1 1010, T2 1015, T3 1020, and T4 1025 are illustrated. FIG. 10 also shows the view of each of the regions—read-only region 1030, fuzzy region 1035, and mutable region 1040.

Thread T4 1025 has the highest value of read-only offset because T4 1025 has refreshed its epoch recently, while T3 1020 has stale values as it has not refreshed recently. However, note that the safe read-only offset for any thread is at most the minimum read-only offset (thread T3 1020) and this is ensured by the epoch protection framework. When the logical address of a record is less than safe read-only, threads may try to create a new record concurrently and only one will succeed due to the atomic compare-and-swap operation on the hash index 150.

Fuzzy Region 1035: When a record falls in the fuzzy region 1035, interestingly, different types of updates can be handled differently. The types of updates in fuzzy region 1035 are classified into three types: namely blind update, read-modify-write and CRDT update. The update scheme for each of these update types is summarized in Table 2 shown in FIG. 10B:

Blind Update: A blind update does not read the old value of a key. Even if one thread is updating a previous location in-place, another thread can create a new record at the end of tail with the new value. Since the updates are issued concurrently, semantics of the application must allow all possible serial orders. Further, we can avoid an expensive retrieval from the disk in case the record is not available in memory, as we do not need the old value.

Read-Modify-Write: A read-modify-write update first reads and then updates a record based on the current value. Since it cannot be configured that no other thread is updating a value concurrently, a new copy cannot be created at the end of tail precisely to avoid the lost-update anomaly discussed earlier. As a result, the update is deferred by placing the context in a pending queue to be processed later, similar to how records on storage are handled.

CRDTs: CRDT updates are RMWs, but present an interesting middle-ground between blind updates and RMWs. CRDTs can be computed as independent partial values that can later be merged to obtain the final value. In the running example (count store) is a CRDT, as multiple partial counts can be summed to obtain the overall count value. With CRDT updates, the fuzzy region may be handled in a manner similar to blind updates. When a record is in the fuzzy region (or on disk), a new delta record is created an linked at the tail, with the update performed on the initial (empty) value. A read reconciles all delta records to obtain the final converged value. One can imagine a scheme that periodically collapses deltas to maintain a bound on the length of delta chains.

Analysis of the Hybrid Log

Cache Behavior and Shaping of the Log: The in-memory portion of a key-value store acts like a cache and so performance heavily depends on its efficiency. Several caching protocols have been proposed in the context of buffer pool management in databases and virtual memory management in operating systems such as First First-Out (FIFO), CLOCK, Least Recently Used (LRU) and an extended version of LRU, the LRU-K Protocol. All of them (except FIFO) require fine-grained per-page (or per-record) statistics to work efficiently. Interestingly, the system, by use of the hybrid log appears to achieve a good caching behavior at a per-record granularity without any such overheads, by virtue of the access pattern. The hybrid in-place and copy update scheme of hybrid log results in efficient caching, quite similar to a Second-Chance FIFO protocol.

The hybrid log shapes the log based on the access pattern and helps keep the hot items in memory. Consider a write-heavy workload the count store example. When a record is retrieved from disk for update, the new record with updated count is created at the end of tail. The record stays in memory and is available for in-place updates, until it enters the read-only region of the hybrid log. If a key is hot, it is likely that there is a subsequent request before it is evicted from memory resulting in a new mutable record. This serves as a second chance for the key to remain cached in memory. Otherwise, it is evicted to disk, making space for hotter keys in memory.

Sizing the Hybrid Log Regions: Sizing the mutable and read-only regions in the hybrid log allocator is important. One extreme (lag=0) is an append-only store, while the other extreme (lag=buffersize) is an in-memory store when data fits in memory. The size of the read-only region determines the degree of second chance provided to a record to stay cached in memory. A smaller read-only (or larger mutable) region results in better in-memory performance due to in-place updates. However, a hot record might be evicted to disk simply because there was no access to that key for a very short time. A larger read-only region, on the other hand, results in expensive append-only updates, causing the log to grow faster. Further, it causes a replication of records in the read-only and mutable region effectively reducing the in-memory cache size. In practice, a 90:10 division of buffer size for the mutable and read-only regions result in good performance.

Recovery and Consistency in Fast: In the event of a failure, the system can recover to a database state that is consistent with respect to the monotonicity property: for any two update requests r1 and r2 issued (in order) by a thread, the state after recovery includes the effects of (1) none; (2) only r1; or (3) both r1 and r2. In other words, the state after recovery cannot include the effects of r2 without also including rt. This property may be achieved using a Write-Ahead-Log (WAL) that logs all the modifications due to a request, similar to traditional databases and modern key-value stores such as RocksDB. Applications can periodically obtain a fuzzy checkpoint of the key-value store memory, which can then be used in combination with the WAL to recover to a consistent state.

Recovering from a fuzzy checkpoint may also be done using a WAL. In one embodiment, recover may be performed without the use of a WAL by treating the hybrid-log as WAL, and delaying commit in order to allow in-place updates within a limited time window.

Checkpointing Fast: While technically the entire hash-index may be rebuilt from the hybrid log, checkpointing the index periodically allows faster recovery. All operations on the Fast index may be performed using atomic compare-and-swap instructions. So, the checkpointing thread can read the index asynchronously without acquiring any read locks. However, since the hash index is being updated concurrently, such a checkpoint is fuzzy, and may not be consistent with respect to a location on the hybrid log. However, hybrid log may be used to recover a consistent version of the hash index from this fuzzy checkpoint.

The tail-offset of the hybrid log is recorded before starting (t1) and after completing (t2) the fuzzy checkpoint. All updates to the hash index during this interval correspond only to records between t1 and t2 on the log, because in-place updates do not modify the index. However, some of these updates may be part of the fuzzy checkpoint and some may not. During recovery, the records between t1 and t2 on the hybrid log are scanned through in order, and the recovered fuzzy index is updated wherever necessary. The resulting index is a consistent hash index that corresponds to hybrid log until t2, because all updates to hash index entries after completing the fuzzy checkpoint (and recording the tail-offset t2) correspond only to records after t2 on the log.

Finally, by moving the read-only offset of the hybrid log to t2, a checkpoint corresponding to location t2 in the log is obtained, after the corresponding flush to disk is complete. Note that this checkpointing algorithm is asynchronous and can be performed in the background without quiescing the database. Every such checkpoint in the system is incremental, as the system offloads only data modified since the last checkpoint. Incremental checkpointing usually requires a separate bitmap-like data structure to identify data that needs to be flushed, whereas Fast achieves this by organizing data differently.

The above technique allows recovery, but the recovered state may violate monotonicity due to in-place updates: update r1 can modify a location $l1 \geq t2$, whereas a later update r2 may modify a location $l2 < l1$. The checkpoint until t2, that includes l2 but not l1, violates monotonicity. Interestingly, monotonicity property may be restored by using epochs and triggering actions so that threads can collaboratively switch over to a new version of the database, as identified by a location on hybrid log.

In one embodiment, every thread is optionally provided with a guarantee of durability after failure, such that all operations until, and none after a recent instant in time, in their sequence of operations on the key-value store system, are guaranteed to be recovered after failure. The recent instant in time may be determined by the system, based on a user request to identify such an instant in time. The guarantee is provided without requiring user threads to ever block during normal execution.

Resizing the hash index: The hash index may need to be resized over time as keys are inserted and removed from the store. Without resizing, bucket linked-lists could grow large and result in reduced performance, or there could be many wasted buckets, resulting in memory waste.

Recall that the index is sized in powers of 2. Logically, there are two versions of the hash index during resizing: one of the current size (old) and another (new) of double the size when growing, or half the size when shrinking. Further, resizing occurs in three phases: prepare-to-resize, resizing, and stable. Both these values (version and phase) are maintained in a single byte called ResizeStatus. A thread reads ResizeStatus to determine what phase it is in. In the common stable phase, threads proceed directly with their operation on the active version of the table.

A hash index is logically divided into n contiguous chunks, where n is set to the smaller of the maximum concurrency and the number of hash buckets in the active version. Chunks serve as the granularity at which threads can independently perform resizing. There is a shared pin array of n counters, which are used only during resizing to indicate the number of threads updating buckets in a given chunk. When a thread wishes to resize, it allocates an index of double (or half) the size, and sets the phase to prepare-to-resize. It then bumps the current epoch with a future trigger action to atomically set the phase to resizing and version to new. Threads that are in the prepare-to-resize phase are aware that resizing is going to occur, but cannot start because other threads may not be aware of resizing yet. Therefore, they use fetch-and-increment to increment the pin count (if it is non-negative) in the pin array entry corresponding to the chunk (in the old version) that they are operating over. Similarly, they decrement the pin count after their operation.

Threads that are in the resizing phase know that all threads are using the pin array. Therefore, they compare-and-swap the pin count of the chunk from 0 to $-\infty$ (until successful) to indicate that they are starting to resize that chunk. Threads in the prepare-to-resize phase that see a negative pin count refresh their value of ResizeStatus to enter the resizing state immediately.

When splitting a chunk, a thread iterates over the records in each hash bucket and copies over entries to one of two destination hash buckets in the new index (merging works similarly). Finally, it increments a counter (numChunks) to indicate that the chunk is done. Threads co-operatively grab other chunks to resize if the chunk they are accessing is being resized by another thread (indicated by a pin count of $-\infty$). Finally, when numChunks reaches n, we are done with resizing, and can set ResizeStatus to stable in order to resume high-performance normal operation.

When using the system with hybrid log, resizing leaves records on disk untouched. A split causes both new hash entries to point to the same disk record, whereas a merge creates a meta-record pointing to two disk records, in the two prior linked-lists, and adds this meta-record to the linked-list for the merged hash entry.

Garbage collection for hybrid log: Hybrid log is a log-structured record store, and as such should be trimmed from the head of the log in order not to grow indefinitely on storage. Interestingly, hybrid log by its nature has lower garbage collection overhead than traditional logs because in-place updates significantly reduce the rate at which the tail of the log grows. Garbage collection on hybrid log may be performed in at least two ways:

Expiration: Data stored in cloud providers often has a maximum time to live, after which it is deleted. This property can be used to periodically delete chunks of log prefixes from storage.

Roll To Roll forward a chunk of the log by scanning from the head and copy over live key-values to the tail.

Expiration-based garbage collection mechanism, reflects use cases where the log is used for analytics, and expires based on data collection guidelines. The hash index keeps track of the earliest valid logical address, and when a thread encounters an invalid address in a hash bucket, it simply deletes it. Further, any linked list traversal of log records is stopped when it encounters an invalid previous logical address.

Identifying Live Values: In the roll-to-tail approach, a given key is identified as to whether the key is live or not, in order to determine if the key should be copied to the tail. While the linked-list can be traversed for the corresponding hash entry, such traversal may be expensive. Instead, an overwrite bit may be reserved in the record header to indicate that the record has been overwritten by a subsequent operation. The overwrite bit can be set to even if the record is in the read-only region (until it gets flushed to disk). On garbage collection, the linked-list scan is performed only for records that do not have the overwrite bit set. This captures the common case of a data item being hot and frequently updated, and then suddenly becoming cold—all earlier versions of the record would have the overwrite bit set, assuming that the record was hot enough to get copied over to the tail before being flushed. The final version of the record (now cold) likely has an entry in the in-memory index, allowing avoidance of a random seek into the log.

Handling read-hot records: The single hybrid log design works well for update-mostly workloads. Reads are simply treated as updates and copied over to the tail of hybrid log. Interestingly, this is a good solution for read-mostly workloads where the working set fits in memory as well, because the read-hot records get clustered into the tail of hybrid log in memory, and provide good in-memory performance without significant log growth.

For a mixed workload with a non-trivial number of read-hot records, the design can accommodate a separate read cache. In fact, a new instance of hybrid log may be created for this purpose. The only difference between the new instance of hybrid log and the primary hybrid log is that there is no flush to disk on page eviction. Record headers in these read-only records point to the corresponding records in the primary log. As in normal hybrid log, the size of the "read-only" region controls the degree of "second chance" that records get (to move back to the tail) before being evicted from the read-only cache.

There are two options for the hash index: (1) The hash index can use an additional hit to identify which log the index address points to. When a read-only record is evicted, the index entry needs to be updated with the original pointer to the record on the primary log. Index checkpoints need to overwrite these addresses with addresses on the primary log. (2) Keep a separate read-only hash index to lookup the read-only hybrid log. Read or update operations on the main index that point to addresses on disk first check this index before issuing an I/O operation. This approach provides clean separation, at the cost of an additional cache miss for read-hot objects.

Interface and code generation: The system separates a compile-time interface, which accepts user-defined read and update logic in the form of functions; and a customized runtime interface, whose code is generated for an application for the required read, upsert, and RMW operations.

The user-defined functions are defined over five types: Key, Value, Input, Output, and Context. The first two types represent the data stored in the system. The input type is used to update or read a value in the store. For instance, in a sequence of CPU readings used to update a per-device average, the key is a device-id (long), input is the reading (int), and the value is the average CPU utilization (float). The Output type is for the output read (or computed) from the value and an (optional) input. For example, input could be a field id to select a field to be copied from the value on a read. Finally, the Context type represents user state that is used to relate asynchronous callbacks with their corresponding original user operation:

```
  void CompletionCallback(Context*);
//Read functions
  void SingleReader(Key*, Input*, Value*, Output*);
  void ConcurrentReader(Key*, Input*, Value*, Output*);
//Upsert functinos
  void SingleWriter (Key*, Value*, Value*);
  void ConcurrentWriter (Key*, Value*, Value*);
//RMW functions
  void InitialUpdater(Key*, Input*, Value*);
  void InPlaceUpdater(Key*, Input*, Value*);
  void CopyUpdater(Key*, Input*, Value*, Value*);
```

For functions that have two parameters of type Value, the first represents the old value and the second represents the new, updated, value. CompletionCallback may be invoked with a user-provided context associated with a pending operation, when completed. To support reads, the user defines two functions. The first, SingleReader, takes a key, an input, and the current value and allows the user to populate a pre-allocated output buffer. The system guarantees read-only access to the value during the operation. The second, ConcurrentReader, is similar, but may be invoked concurrently with updates or writes; the user is expected to handle concurrency (e.g., using an S-X lock).

Two kinds of updates may be supported: Upserts and RMWs. An upsert includes two functions: SingleWriter overwrites the value with a new value, where the system guarantees exclusive write access. ConcurrentWriter may be called (as its name implies) concurrently with other reads and writes. An RMW utilizes three update functions: an InitialUpdater to populate the initial value, an InPlaceUpdater to update an existing value in-place, and a CopyUpdater to write the updated value into a new location, based on existing value and the input. Initial and copy updaters are guaranteed exclusive access to the value, whereas in-place updaters may be invoked concurrently. Users can optionally indicate that an RMW is mergeable, which allows Fast to apply CRDT optimizations.

The functions may be used to generate a system runtime interface:

```
  Status Read(Key*, Input*, Output*, Context*);
  Status Upsert(Key*, Input*, Context*);
  Status RMW(Key*, Input*, Context*);
  Status Delete(Key*, Context*);
  void Acquire( ) void Release( )
  void CompletePending(bool wait);
```

Read takes a key, an input, and a pre-allocated buffer for storing the output. Upsert and RMW take a key and value as parameters. Threads call Acquire and Release to register and deregister with Fast. They call CompletePending regularly to continue pending operations. A thread may optionally block (when wait=true), until all outstanding operations issued by the thread are completed.

While it is possible to implement these advanced operations on top of a simple key-value interface, such layering adds significant overheads to the end-to-end application performance. For example, one might choose to use an atomic fetch-and-add instead of latches to build a sum-based update store, use non-latched operations in SingleReader and SingleWriter, or even use non-latched operations everywhere if they know that their input arrives partitioned.

Log analytics: The system record log is a sequence of updates to the state of the application. Such a log can be directly fed into a stream processing engine to analyze the application state across time. For example, one may measure the rate at which values grow over time, or produce hourly dashboards of the hottest keys in the application. The size of read-only and in-place updatable regions in hybrid log controls the frequency of updates to values present in the log. Point-in-time queries may be handled by scanning the log, or querying historical values of a given key (since record versions are linked in the log).

Algorithms for hybrid log and the system;

FIG. 11A is a representation of an algorithm 1100 for implementing the hybrid log. An allocate function is invoked at 1110 by a thread when the thread wishes to allocate a new record. New records are allocated at the tail using fetch-and-add. If the address is within a logical page at line 3 1115, the logical address is simply returned at line 4, 1120. The first thread whose Allocate overflows the page handles buffer maintenance at line 20, 1125, and resets the offset for the new page at line 31, 1130. Other threads spin-wait at line 18, 1135 for this thread to reset the offset.

Figure 11B:
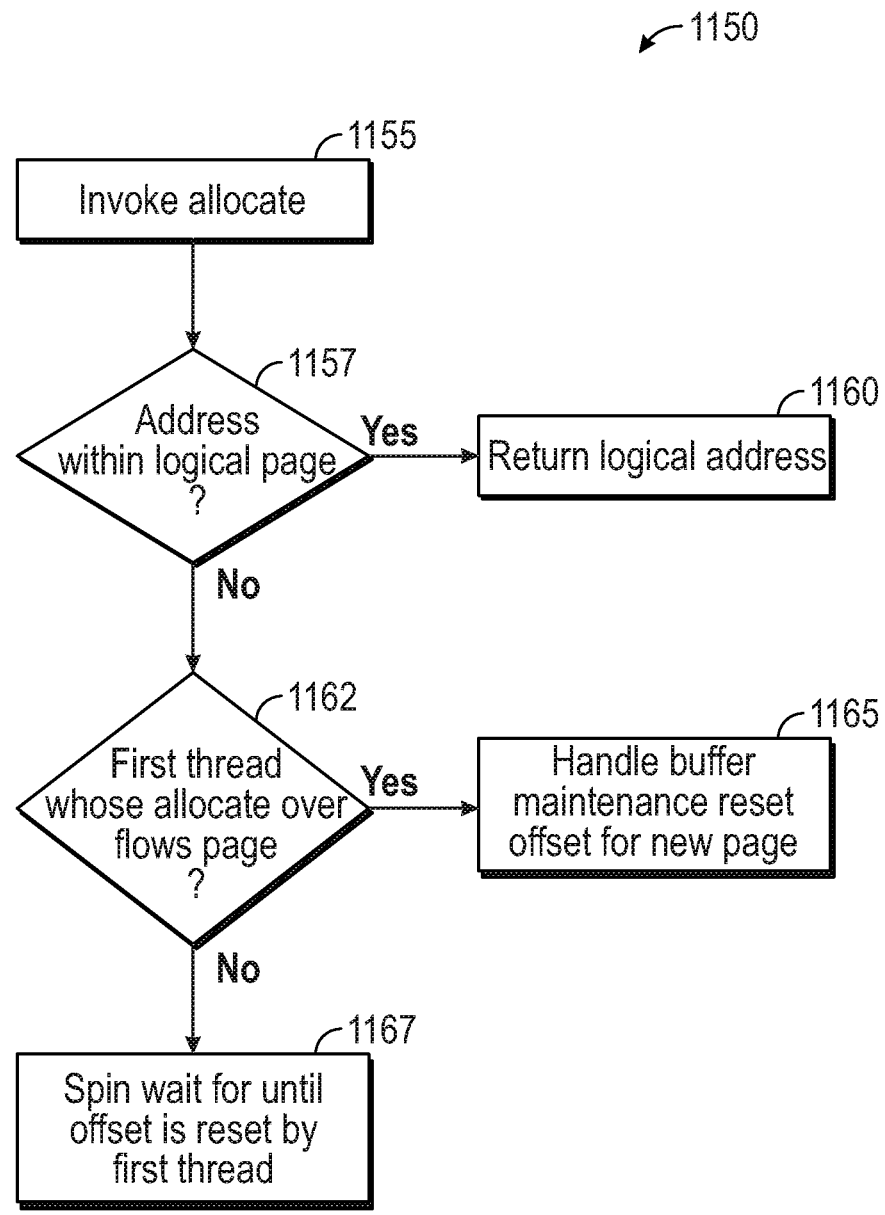
FIG. 11B is a flowchart representation of a method for implementing a hybrid log according to an example embodiment.

FIG. 11B is a flowchart representation corresponding to algorithm 1100, of a method 1150 for implementing the hybrid log. An allocate function is invoked at 1155 by a thread when the thread wishes to allocate a new record. New records are allocated at the tail using fetch-and-add. If the address is within a logical page at operation 1157, the logical address is simply returned at 1160. The first thread whose Allocate overflows the page as determined at 1162, handles buffer maintenance at 1165, and resets the offset for the new page. Other threads spin-wait at operation 1167 for the first thread to reset the offset.

Read, Upsert, and RMW algorithms for the system using the hybrid log are shown in FIGS. 12 at 1200, 13 at 1300, and 14B at 1400 respectively. The find_tag procedure 1210 finds an existing (non-tentative) entry in the index, while find_or_create_tag procedure 1310 returns an existing (non-tentative) entry, or creates a new one, using the two-phase insert algorithm. The trace_back_until procedure 1410 traverses the record linked-list that is present in memory to obtain the logical address of the record that corresponds to the key or first on-disk record (obtained from the last record in memory).

Figure 12B:
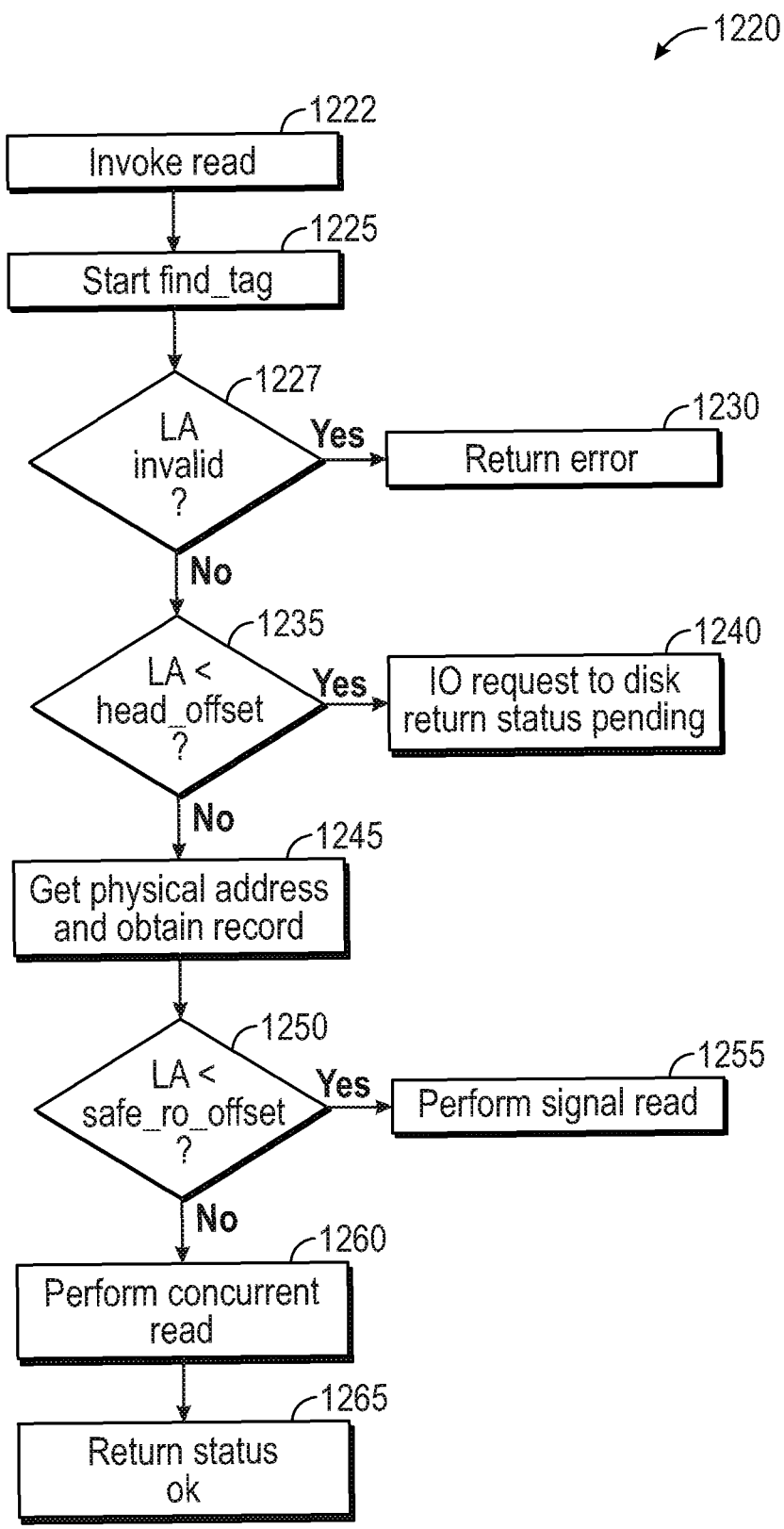
FIG. 12B is a flowchart representation of a method for implementing a find-tag procedure according to an example embodiment.

A read operation as illustrated in flowchart form in FIG. 12B as a method 1220, issues a read request to disk if logical address is less than head offset, reads using the single reader if record is in the safe-read-only region, or the concurrent reader if it is in the fuzzy or mutable region.

The read operation is invoked at 1227 and begins by performing a find_tag operation at 1225. If the logical address (LA) is invalid at 1227, an error is returned at 1230. Otherwise, if the LA is less than the head offset at 1235, an IO request to disk is issued at 1240, and a status of pending is returned. If the LA is not less than the head offset, the physical address is obtained and the record is retrieved at 1245. At 1250, if the LA is less than the safe RO offset, a single read is performed at 1255. Otherwise, a concurrent read is performed at 1260 and a status of OK is returned at 1265.

Figure 13B:
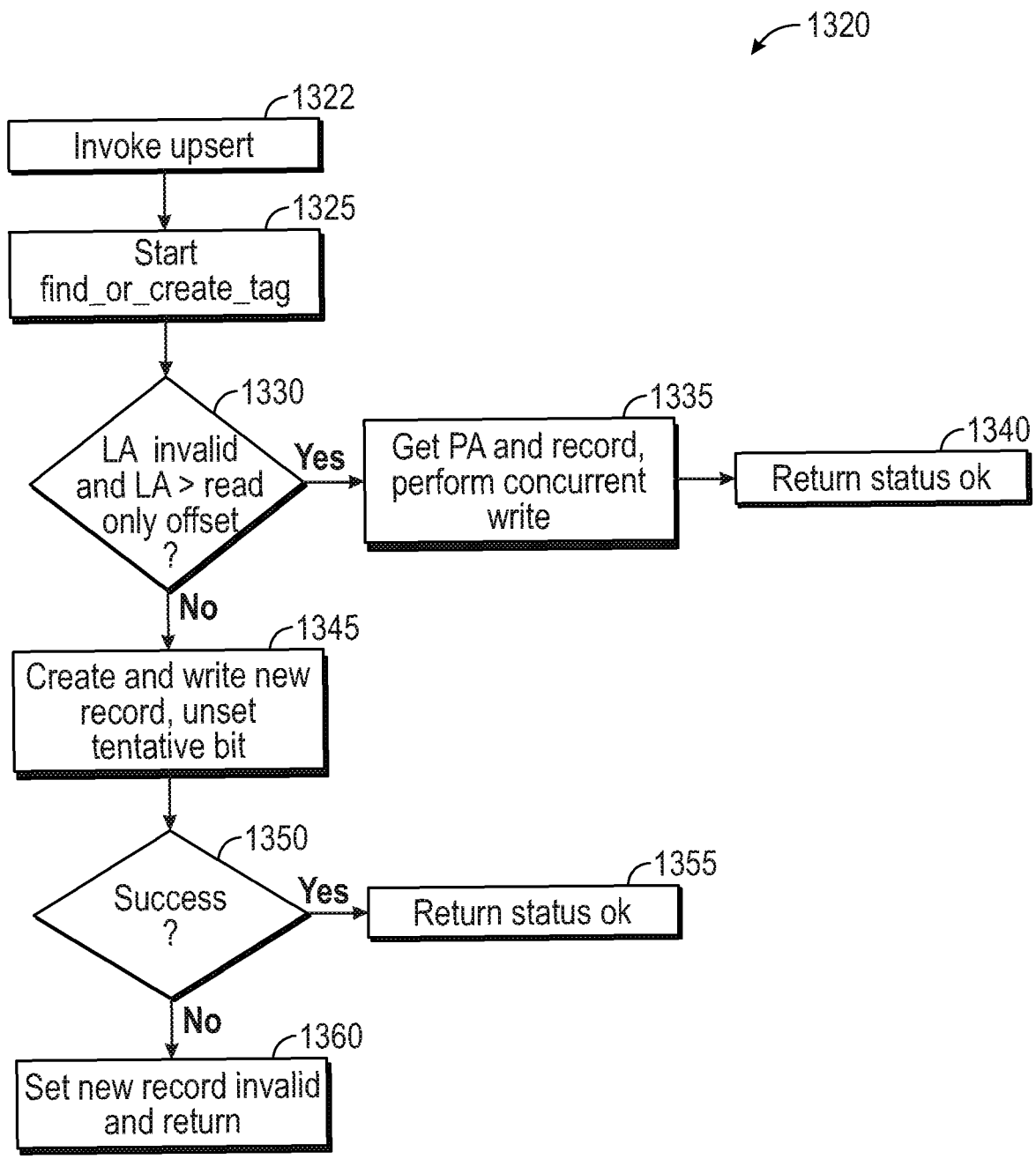
FIG. 13A is a representation of an algorithm for implementing a find_or_create_tag procedure according to an example embodiment.

Upsert, as illustrated in flowchart form in FIG. 13B as a method 1320, updates in-place if the record is in the mutable region, and creates a new copy at the tail otherwise. The upsert operation is invoked at 1322 and a find or create tag operation is performed at 1325. If the LA is invalid and the LA is greater than the read only offset at 1330, the PA and record are set, and a concurrent write is performed at 1335. A status of OK is then returned at 1340.

If neither the LA is invalid and the LA is greater than the read only offset at 1330, the records is created and written at 1345, along with unsetting the tentative bit. If successful as determined at 1350, a status of OK is returned at 1355. If not, the new record is set as invalid as indicated at 1360.

Figure 14B:
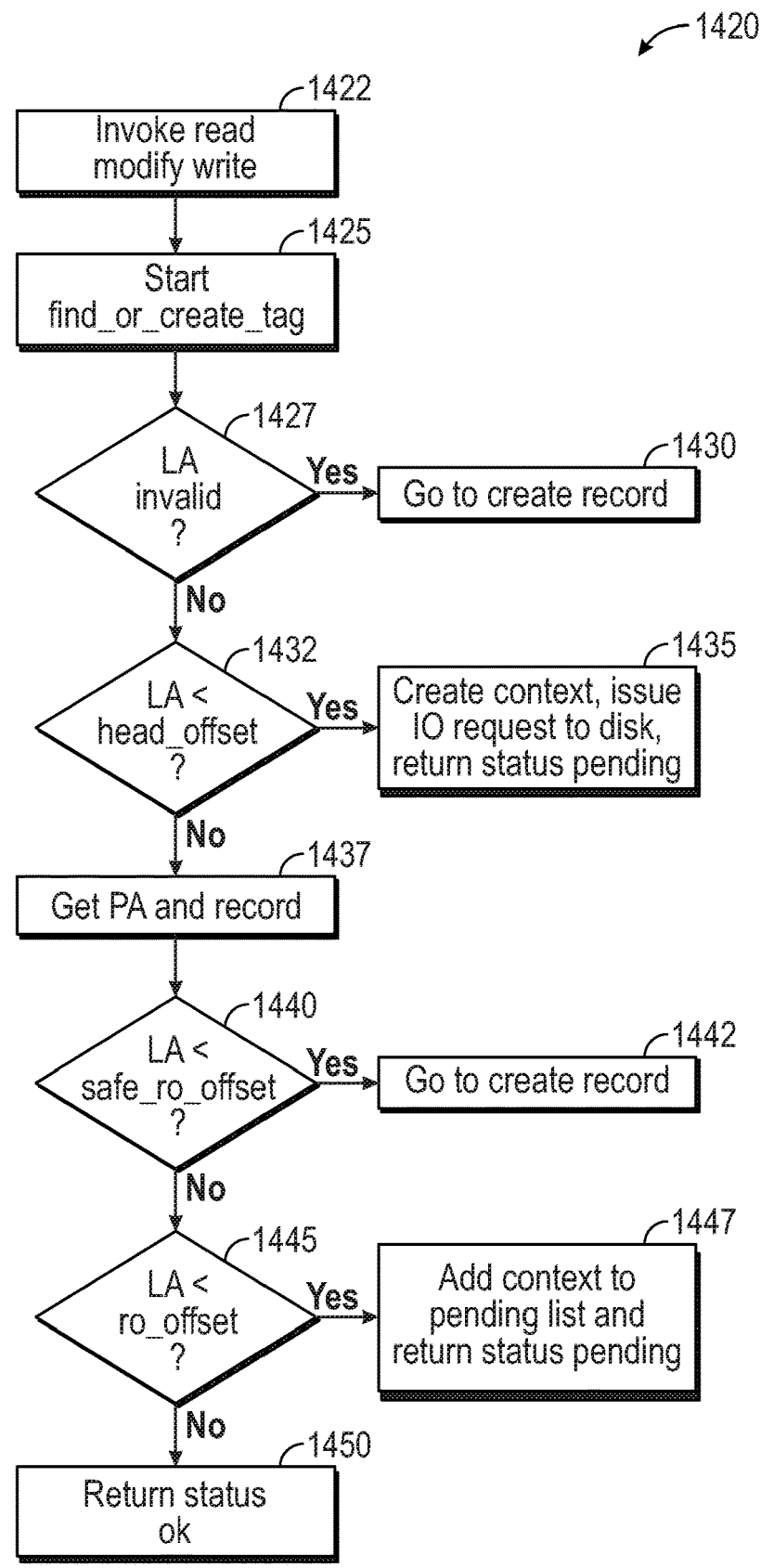

RMW, as illustrated in flowchart form in FIGS. 14B and 14C as a method 1420, issues a read request if logical address is less than head offset; creates a new record at the tail if it is in the safe-read-only region; puts an operation into a pending list for processing later, if it is in the fuzzy region; and updates it in-place if it is in the mutable region. An RMW is invoked at 1422 and begins by starting a find or create tag operation 1425. If the LA is invalid at 1427, processing goes to a CREATE RECORD function starting at 1455 in FIG. 14C as indicated at 1430. If valid, and the LA is less than the head offset at 1432, a context is created at 1435 along with issuing an IO request to disk and returning a status of pending. If the LA is greater than the head offset at 1432, the PA and record are set at 1437. Operation 1440 then determines if the LA is less than SAFE_RO_OFFSET. If yes, processing goes to a CREATE RECORD function starting at 1455 in FIG. 14C as indicated at 1442. If no, and if LA is less than the RO_OFFSET, the context is added to the pending list at 1447, and a status of pending is returned. Otherwise, a status of OK is returned at 1450.

Figure 14C:
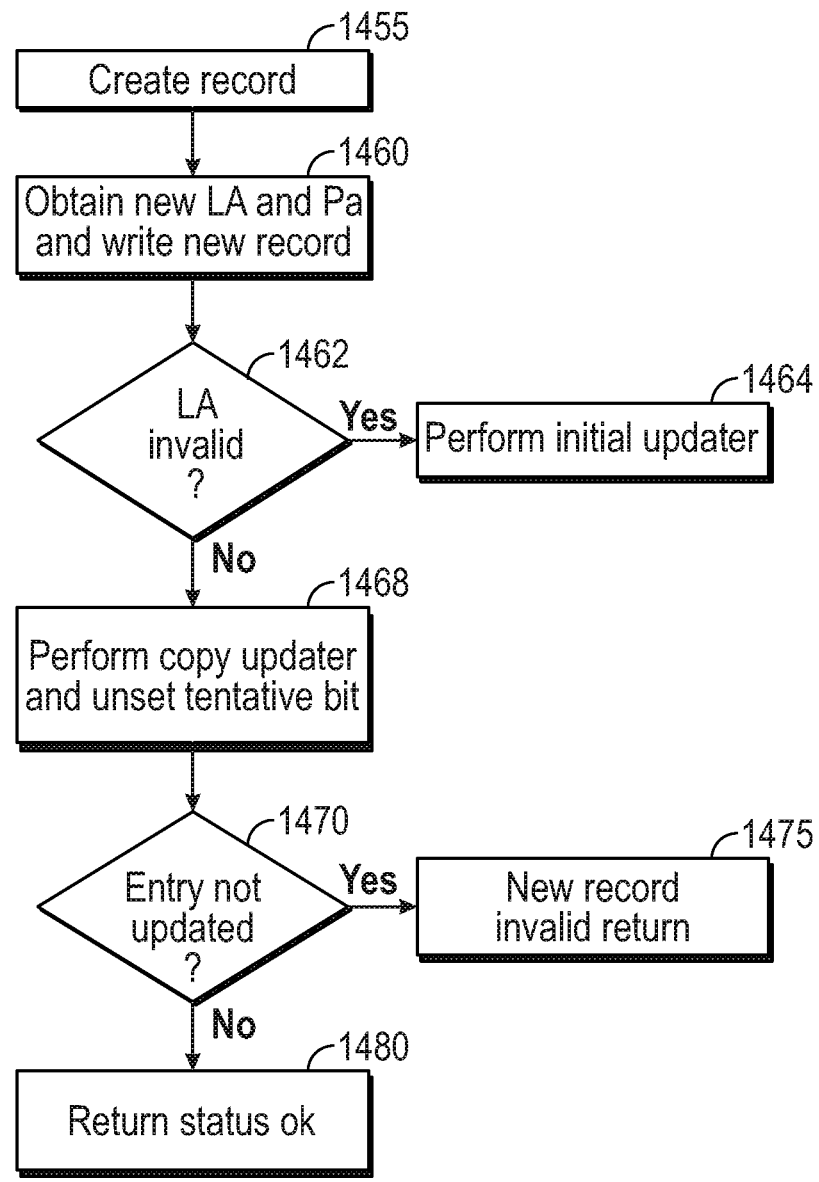

The create record function 1455 in FIG. 14C begins by obtaining a new LA and PA, and writing a new record at 1460. If LA is invalid as indicated by operation 1462, an initial update is performed at 1464. If not, a copy updater is performed, and the tentative bit is unset at 1468. At 1470, if the entry was not updated, the new record is invalid, and processing returns at 1475. Otherwise a status of OK is returned at 1480.

For Reads and RMW, the operation context is enqueued into a pending queue when the asynchronous operation is complete. These operations continue processing (using their saved contexts) when the user invokes CompletePending.

FIG. 15 is a block schematic diagram of a computer system 1500 to implement and manage the key-value store system, including, use of the hash index, trigger functions, various allocators such as the hybrid log, and other methods and algorithms according to example embodiments. All components need not be used in various embodiments.

One example computing device in the form of a computer 1500 may include a processing unit 1502, memory 1503, removable storage 1510, and non-removable storage 1512. Although the example computing device is illustrated and described as computer 1500, the computing device may be in different forms in different embodiments. For example, the computing device may instead be a smartphone, a tablet, smartwatch, smart storage device (SSD), or other computing device including the same or similar elements as illustrated and described with regard to FIG. 15. Devices, such as smartphones, tablets, and smartwatches, are generally collectively referred to as mobile devices or user equipment.

Although the various data storage elements are illustrated as part of the computer 1500, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 1503 may include volatile memory 1514 and non-volatile memory 1508. When referring to the records of the key-value records that are stored in memory, memory 1503 may include a single memory dedicated to the records and programming, or a memory that has different physical memory portions for each. Memory 1503 may also include storage when used in the context of referring to the entire set of key-value records. Computer 1500 may include—or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1500 may include or have access to a computing environment that includes input interface 1506, output interface 1504, and a communication interface 1516. Output interface 1504 may include a display device, such as a touchscreen, that also may serve as an input device. The input interface 1506 may include one or more of a touchscreen, touchpad, mouse, keyboard, camera, one or more device-specific buttons, one or more sensors integrated within or coupled via wired or wireless data connections to the computer 1500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1500 are connected with a system bus 1520.

Computer-readable instructions stored on a computer-readable medium are executable by the processing unit 1502 of the computer 1500, such as a program 1518. The program 1518 in some embodiments comprises software to implement one or more of the key-value store system methods and algorithms to provide a fast, persistent key-value store. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1518 along with the workspace manager 1522 may be used to cause processing unit 1502 to perform one or more methods or algorithms described herein.

EXAMPLES

1. A system includes a processor and a memory storing multiple records in a key-value data structure and processor executable instructions for managing access to records in the key-value data structure. The instructions are executable to perform operations including managing a shared atomic epoch counter and thread epoch counters, determining a maximal safe epoch as a function of the shared atomic epoch counter and the thread epoch counters, maintaining a drain list of trigger actions, and triggering the trigger actions in the drain list as a function of an update of the shared atomic epoch counter and the maximal safe epoch.

2. The system of claim 1 wherein trigger actions comprises an action associated with a thread to be triggered at a future instant of time responsive to a current epoch being safe.

3. The system of claim 1 wherein the drain list of trigger actions comprises thread generated trigger actions and includes epoch, action pairs.

4. The system of claim 1 wherein a trigger action comprises a processor executable code fragments.

5. The system of claim 1 wherein triggering the trigger actions comprises performing an atomic compare-and-swap on the drain list to ensure a trigger actions are executed exactly once.

6. The system of claim 1 wherein a thread is configured to acquire an entry in the drain list, refresh the thread epoch counter to the shared atomic epoch counter, increment the shared atomic epoch counter, and add a trigger action to the drain list, and release an entry from a shared thread epoch counter table.

7. The system of claim 1 wherein the memory includes a hash-based index divided into hash buckets, each bucket corresponding to a cache line and each bucket having an address, a tag, and a tentative bit, wherein a set tentative bit deems an entry in the bucket as invisible to concurrent reads and updates.

8. The system of claim 7 wherein a latch-free, non-blocking two-phase insert operation leverages the tentative bit to guarantee that the hash index is in a valid state at all times.

9. The system of claim 8 wherein the memory includes a hash-based index and an allocator that allocates records to memory via use of the hash-based index and wherein the allocator comprises an in-memory allocator, an append-only-log, and a hybrid-log.

10. The system of claim 9 wherein the memory comprises main memory and storage, and wherein the hybrid-log divides the memory storing the records into a hot portion on which in-place updates are performed, shaping the hot portion, and a cold portion, split between main memory and storage, on which read-copy-updates are performed.

11. The system of claim 10 and further comprising a safe read only offset tracking a read-only offset seen by all threads, and a read-only offset comprising a minimum value of read-only offset seen by any active thread, wherein the region between such offsets is a fuzzy region where threads remain pending and retry at a later point in time.

12. A computer implemented method includes managing a shared atomic epoch counter and thread epoch counters for a key-value store system, accessing records stored in the key-value store system via threads, using a key based hash index to locate the records, determining a maximal safe epoch responsive as a function of the shared atomic epoch counter and the thread epoch counters, maintaining a drain list of trigger actions, and triggering the trigger actions in the drain list as a function of an update of the shared atomic epoch counter and the maximal safe epoch.

13. The method of claim 12 wherein trigger actions comprises an action associated with a thread to be triggered at a future instant of time responsive to a current epoch being safe, wherein the drain list of trigger actions comprises thread generated trigger actions and includes epoch, action pairs, and wherein triggering the trigger actions comprises performing an atomic compare-and-swap on the drain list to ensure trigger actions are executed exactly once and wherein a thread is configured to acquire an entry in the drain list, refresh the thread epoch counter to the shared atomic epoch counter, increment the shared atomic epoch counter and add a trigger action to the drain list, and release an entry from a shared thread epoch counter table.

14. The method of claim 12 wherein every thread is optionally provided with a guarantee of durability after failure, such that all operations until, and none after a recent instant in time, in their sequence of operations on the key-value store system, are guaranteed to be recovered after failure without blocking all threads.

15. The method of claim 12 wherein the hash-based index is divided into hash buckets, each bucket corresponding to a cache line and having an address, a tag, and a tentative bit, wherein a set tentative bit deems an entry in the bucket as invisible to concurrent reads and updates.

16. The method of claim 11 and further comprising dividing memory of the computer storing the records into a hot portion on which in-place updates are performed and a cold portion on which read-copy-updates are performed.

17. A machine-readable storage device has instructions for execution by a processor of a machine having main memory and storage to cause the processor to perform operations to perform a method. The operations include managing a shared atomic epoch counter and thread epoch counters for a key-value store system, accessing records stored in the key-value store system via threads, using a key based hash index to locate the records in a memory of the system, determining a maximal safe epoch responsive as a function of the shared atomic epoch counter and the thread epoch counters, maintaining a drain list of trigger actions, and triggering the trigger actions in the drain list as a function of an update of the shared atomic epoch counter and the maximal safe epoch.

18. The machine-readable storage device of claim 17 wherein trigger actions comprises an action associated with a thread to be triggered at a future instant of time responsive to a current epoch being safe, wherein the drain list of trigger actions comprises thread generated trigger actions and includes epoch, action pairs, and wherein triggering the trigger actions comprises performing an atomic compare-and-swap on the drain list to ensure a trigger actions is executed exactly once.

19. The machine-readable storage device of claim 17 wherein the hash-based index is divided into hash buckets, each bucket corresponding to a cache line and having an address, a tag, and a tentative bit, wherein a set tentative bit deems an entry in the bucket as invisible to concurrent reads and updates.

20. The machine-readable storage device of claim 17 and further comprising dividing memory of the computer storing the records into a hot portion on which in-place updates are performed and a cold portion on which read-copy-updates are performed, and wherein the records are addressed in a single logical address space across the main memory and data storage.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
a processor;
a memory storing a hash index, multiple records in a key-value data structure accessed via the hash index, and processor executable instructions for managing access to records in the key-value data structure, wherein the keys are not part of the hash index, and wherein the instructions are executable to perform operations comprising;
managing a shared atomic epoch counter and thread epoch counters;
determining a maximal safe epoch as a function of the shared atomic epoch counter and the thread epoch counters, wherein the maximal safe epoch is equal to one less than the minimum of all non-zero thread epoch counters;
maintaining a drain list of global trigger actions generated by threads, each global trigger action having an associated maximal safe epoch value assigned by the threads; and
triggering the global trigger actions in the drain list for execution by the processor in response to each trigger action's associated maximal safe epoch value being reached.

2. The system of claim 1 wherein trigger actions comprises an action associated with a thread to be triggered at a future instant of time responsive to a current epoch being safe and wherein the shared atomic epoch counter is incremented for coordination of global system actions.

3. The system of claim 1 wherein the drain list of trigger actions comprises thread generated trigger actions and includes epoch, action pairs.

4. The system of claim 1 wherein a trigger action comprises a processor executable code fragments.

5. The system of claim 1 wherein triggering the trigger actions comprises performing an atomic compare-and-swap on the drain list to ensure a trigger actions are executed exactly once.

6. The system of claim 1 wherein a thread is configured to acquire an entry in the drain list, refresh the thread epoch counter to the shared atomic epoch counter, increment the shared atomic epoch counter, and add a trigger action to the drain list, and release an entry from the shared thread epoch counter table.

7. The system of claim 1 wherein the memory includes the entire hash-based index to access records in the key-value data structure, wherein the hash-based index is divided into hash buckets, each bucket corresponding to a cache line and each bucket having an address, a tag, and a tentative bit, wherein a set tentative bit deems an entry in the bucket as invisible to concurrent reads and updates.

8. The system of claim 7 wherein a latch-free, non-blocking two-phase insert operation leverages the tentative bit to guarantee that the hash index is in a valid state at all times.

9. The system of claim 8 wherein the memory includes a hash-based index and an allocator that allocates records to memory via use of the hash-based index and wherein the allocator comprises an in-memory allocator, an append-only-log, and a hybrid-log.

10. The system of claim 9 wherein the memory comprises main memory and storage, and wherein the hybrid-log divides the memory storing the records into a hot portion on which in-place updates are performed, shaping the hot portion, and a cold portion, split between main memory and storage, on which read-copy-updates are performed.

11. The system of claim 10 and further comprising a safe read only offset tracking a read-only offset seen by all threads, and a read-only offset comprising a minimum value of read-only offset seen by any active thread, wherein the region between such offsets is a fuzzy region where threads remain pending and retry at a later point in time.

12. A computer implemented method comprising:
managing a shared atomic epoch counter and thread epoch counters for a key-value store system;
accessing records stored in the key-value store system via threads, using a key based hash index to locate the records;
determining a maximal safe epoch as a function of the shared atomic epoch counter and the thread epoch counters, wherein the maximal safe epoch is equal to one less than the minimum of all non-zero thread epoch counters;
maintaining a drain list of global trigger actions generated by threads, each global trigger action having an associated maximal safe epoch value assigned by the threads; and
triggering the global trigger actions in the drain list for execution by the processor in response to each trigger action's associated maximal safe epoch value being reached.

13. The method of claim 12 wherein trigger actions comprises an action associated with a thread to be triggered at a future instant of time responsive to a current epoch being safe, wherein the drain list of trigger actions comprises thread generated trigger actions and includes epoch, action pairs, and wherein triggering the trigger actions comprises performing an atomic compare-and-swap on the drain list to ensure trigger actions are executed exactly once and wherein a thread is configured to acquire an entry in the drain list, refresh the thread epoch counter to the shared atomic epoch counter, increment the shared atomic epoch counter and add a trigger action to the drain list, and release an entry from the shared thread epoch counter table.

14. The method of claim 12 wherein every thread is optionally provided with a guarantee of durability after failure, such that all operations until, and none after a recent instant in time, in their sequence of operations on the key-value store system, are guaranteed to be recovered after failure without blocking all threads.

15. The method of claim 12 wherein the hash-based index is divided into hash buckets, each bucket corresponding to a cache line and having an address, a tag, and a tentative bit, wherein a set tentative bit deems an entry in the bucket as invisible to concurrent reads and updates.

16. The method of claim 11 and further comprising dividing memory of the computer storing the records into a hot portion on which in-place updates are performed and a cold portion on which read-copy-updates are performed.

17. A machine-readable storage device having instructions for execution by a processor of a machine having main memory and storage to cause the processor to perform operations to perform a method, the operations comprising:
managing a shared atomic epoch counter and thread epoch counters for a key-value store system;
accessing records stored in the key-value store system via threads, using a key based hash index to locate the records in a memory of the system;
determining a maximal safe epoch as a function of the shared atomic epoch counter and the thread epoch counters, wherein the maximal safe epoch is equal to one less than the minimum of all non-zero thread epoch counters;
maintaining a drain list of global trigger actions generated by threads, each global trigger action having an associated maximal safe epoch value assigned by the threads; and
triggering the global trigger actions in the drain list for execution by the processor in response to each trigger action's associated maximal safe epoch value being reached.

18. The machine-readable storage device of claim 17 wherein trigger actions comprises an action associated with a thread to be triggered at a future instant of time responsive to a current epoch being safe, wherein the drain list of trigger actions comprises thread generated trigger actions and includes epoch, action pairs, and wherein triggering the trigger actions comprises performing an atomic compare-and-swap on the drain list to ensure a trigger actions is executed exactly once.

19. The machine-readable storage device of claim 17 wherein the hash-based index is divided into hash buckets, each bucket corresponding to a cache line and having an address, a tag, and a tentative bit, wherein a set tentative bit deems an entry in the bucket as invisible to concurrent reads and updates.

20. The machine-readable storage device of claim 17 and further comprising dividing memory of the computer storing the records into a hot portion on which in-place updates are performed and a cold portion on which read-copy-updates are performed, and wherein the records are addressed in a single logical address space across the main memory and data storage.

* * * * *